March 19, 1968   R. C. RICHMOND ET AL   3,374,465
MULTIPROCESSOR SYSTEM HAVING FLOATING EXECUTIVE CONTROL
Filed March 19, 1965                          13 Sheets-Sheet 3
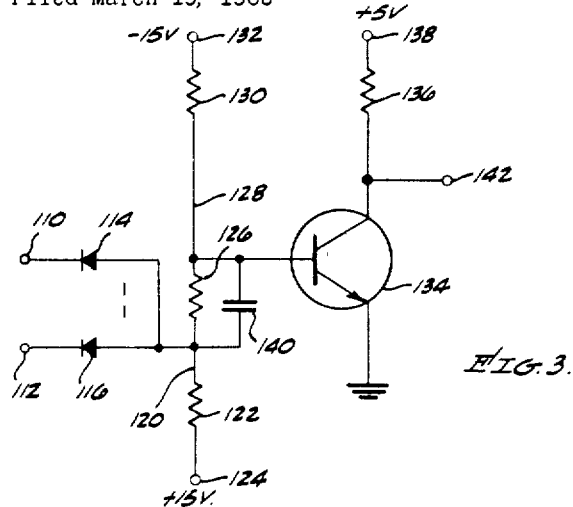
FIG. 3.
FIG. 21.
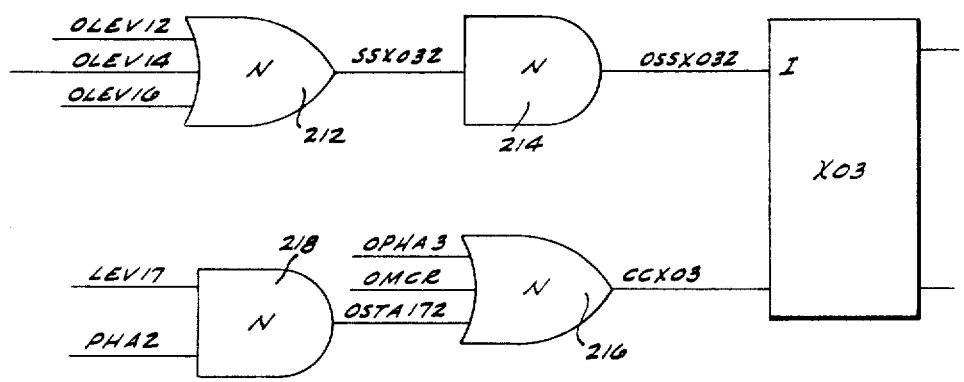
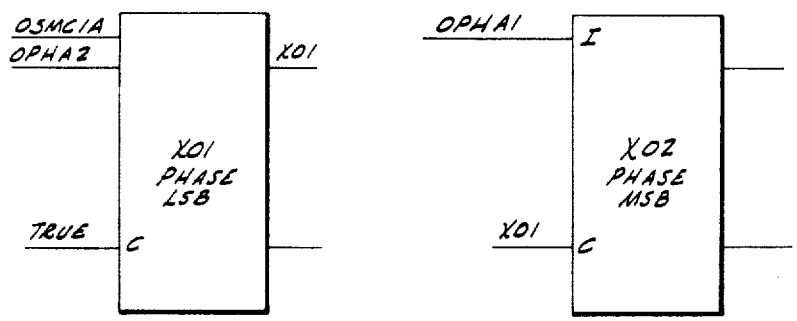

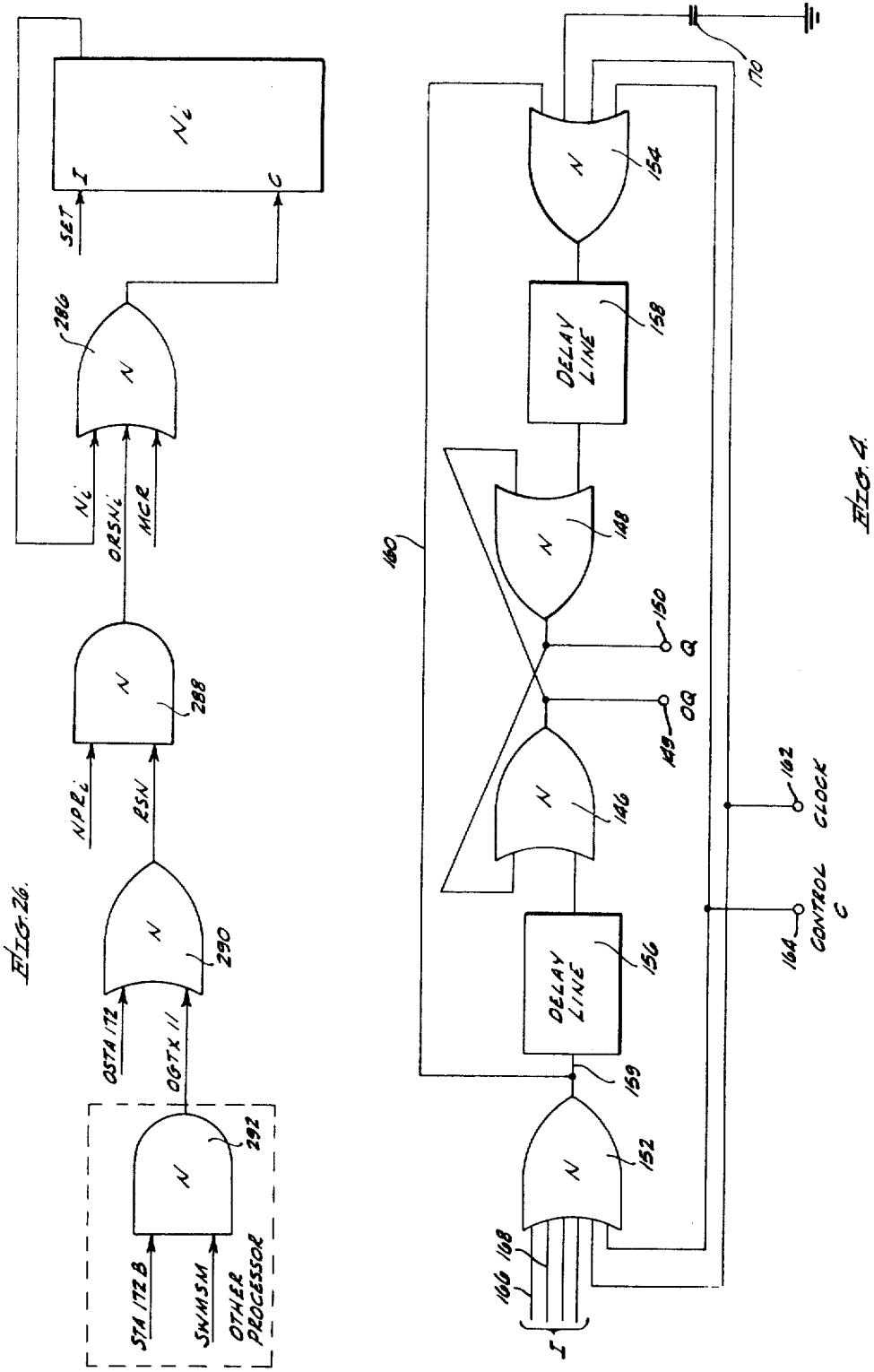

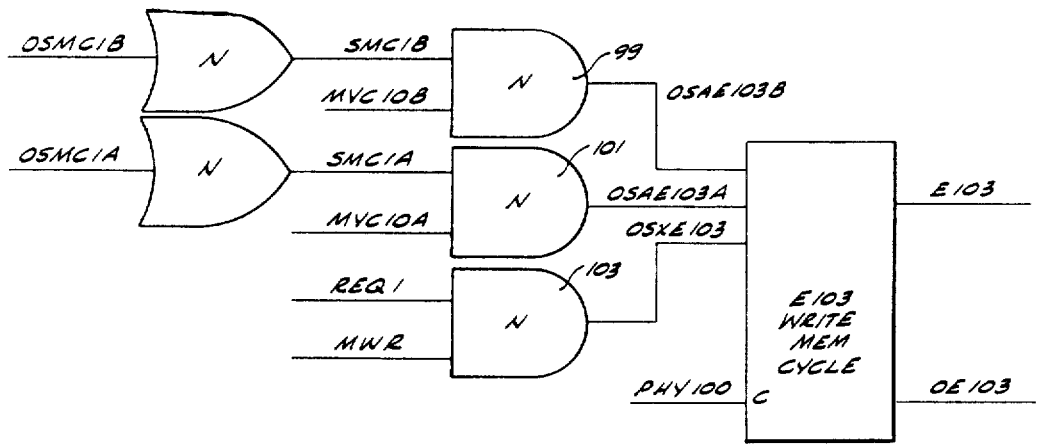
FIG. 8.
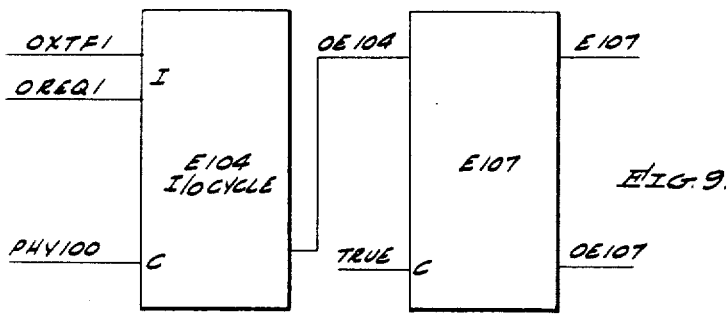
FIG. 9.
FIG. 6
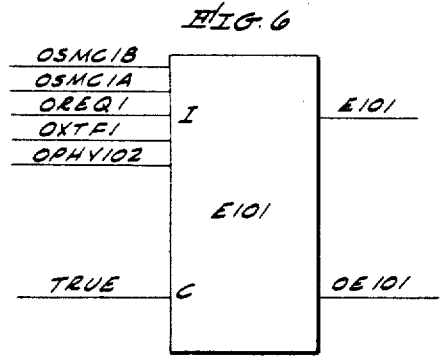
FIG. 10.
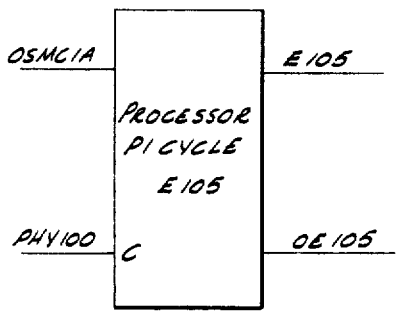
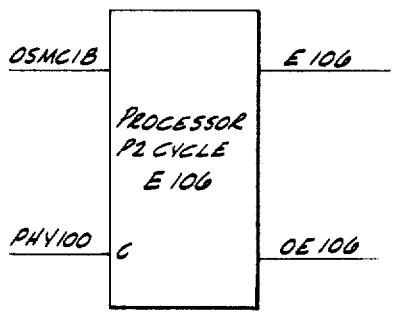

March 19, 1968    R. C. RICHMOND ET AL    3,374,465
MULTIPROCESSOR SYSTEM HAVING FLOATING EXECUTIVE CONTROL
Filed March 19, 1965    18 Sheets-Sheet 17

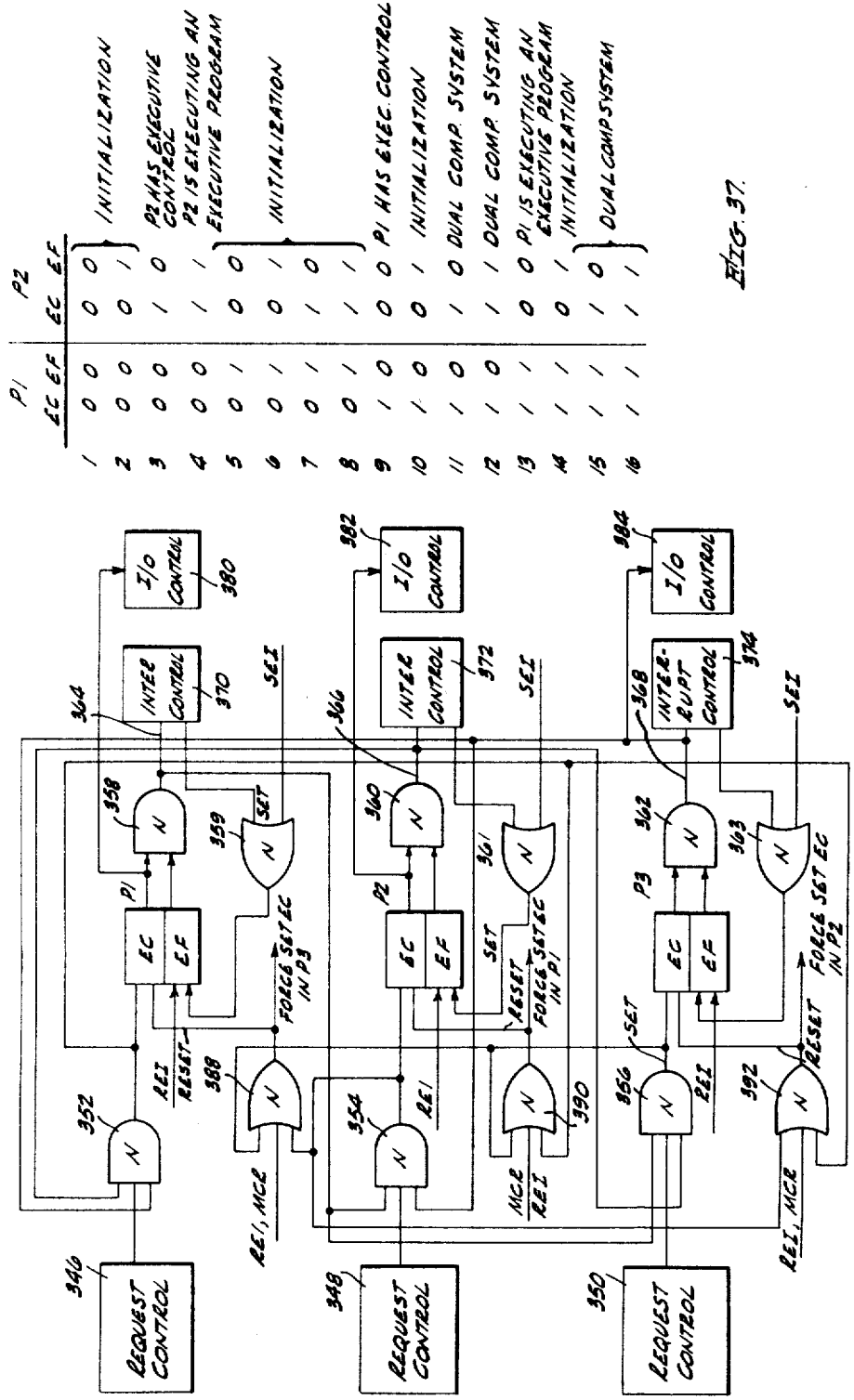

_3,374,465_
MULTIPROCESSOR SYSTEM HAVING FLOATING EXECUTIVE CONTROL
Richard C. Richmond and Jack J. Pariser, Orange, and Thomas A. Connolly, Hacienda Heights, Calif., assignors to Hughes Aircraft Company, Culver City, Calif., a corporation of Delaware
Filed Mar. 19, 1965, Ser. No. 441,189
20 Claims. (Cl. 340—172.5)

ABSTRACT OF THE DISCLOSURE

A multiprocessor computer system comprising an executive control logic circuit and an executive function logic circuit in each processor with the executive control logic circuits functioning as program indicators. Any of the executive control logic circuits may be set as a result of the processor's set instruction or of any processor's reset instruction. The executive function logic circuit is maintained in a set state during an executive routine or an interrupt routine. The system provides an executive "or" type of control circuit so that the computer's operation may be continued in event of a failure of a portion of the processors and to ensure that one and only one processor has executive control during any given time period.

---

This invention relates to multiprocessor computer systems and particularly to a system utilizing a plurality of processors in which each processor continually has an equal opportunity to exercise executive control of the overall computing operation.

Multiprocessor computer systems are advantageous for providing relatively high computational speeds such as in real time processing systems, or in any system where a maximum amount of processing is desired to be performed for any period of time. In real time operation, for example, multiprocessor systems are desirably arranged with separate groups of elements or modules for obtaining system survivability in the event of a unit failure. A further advantage of multiprocessors in modular arrangements is that additional processor and memory modules may be added or removed from an installation as required by changes in the job requirements. Conventional multiprocessor systems operate in a master-slave control relationship in which a predetermined processor always has executive control or in an independent manner in which each computer including a processor and memory solves its set of problems and periodically exchanges information with other computers. Multiprocessor systems in master-slave configurations suffer from inefficiencies and may be completely disabled by the failure of the master processor. In an arrangement in which the master processor is capable of performing only executive control functions, the master processor may be designed to be fully loaded for one program configuration of specific slave processor or processors. However, this system will not be efficient in any processor and program configuration which requires less executive control. Regardless of the efficiency of the master processor, the total system efficiency of the master-slave system may be reduced as a result of program or system configuration changes, because the slave processor or processors may be required to wait for the master processor to provide the next task assignment. Similarly, a system in which each processor operates independently of the other with periodic exchanges of data is inefficient because of the time required to exchange data and because waiting periods may be required before data is available to perform a dependent program. Another disadvantage of a plurality of independently operating processors is that even though a program may be selected to minimize waiting or idle times, interrupt times such as during performance of a routine in response to a request from an input-output unit may result in substantially long waiting periods of some processors.

It is therefore an object of this invention to provide a multiprocessor computer system that operates with a high degree of overall efficiency.

It is another object of this invention to provide a multiprocessor system in which the task assignment function may be transferred between different processors by an "exclusive or" type control operation.

It is still another object of this invention to provide a processing system in which each of a plurality of data handling units have an equal opportunity to exercise executive control of the overall operation but in which only one data handling unit exercises executive control at any one time.

It is a further object of this invention to provide a multiprocessor computer system in which the executive control function may be continually transferred between processor units with the processor unit having executive control responding to interrupt and selected input-output operations.

It is a still further object of this invention to provide a multiprocessor system in which system operation may continue upon failure of a portion of the processors.

It is a further object of this invention to provide a system in which multiprocessor or single processor operation may be selected.

It is a further object of this invention to provide a multiprocessor system in which indicators control the transfer of the executive function.

It is a further object of this invention to provide a multiprocessor system in which the program interrupt operation and the executive function utilize common control elements.

It is a further object of this invention to provide an improved multiprocessor system utilizing a plurality of memory banks.

Briefly the multiprocessor system having floating executive control in accordance with the principles of the invention includes a plurality of processors each capable of accessing a memory system which may be a multiple bank memory in some arrangement in accordance with the principles of the invention. Each processor has executive control indicators which may include an executive control flip flop and an executive function flip flop. Both flip flops may be set as a result of a computer instruction and the last instruction of a job routine may request both executive control and executive function which is granted in the requesting processor if the other processor is not performing an executive function. Setting the executive control flip flop of one processor resets the control flip flop of the other processors to provide an "exclusive or" type executive control. The executive control flip flop may be set as a result of its processor's set instruction or as a result of another processor's reset instruction. Set instructions are obeyed by the executive control flip flop only when no other processor is engaged in an executive task as indicated by the executive function indicator and the set instructions are obeyed by the executive function flip flop only when that processor's executive control indicator is set. In response to a failure condition of any processor, that processor forces another processor to accept the executive control. Both the interrupt controls and a portion of the input-output operation are controlled by the processor having the executive responsibility. The system in accordance with the invention allows a new program to be utilized upon failure of a portion of the processors.

The novel features of the invention, as well as the invention itself, both as to its organization and method of operation, will best be understood from the accompanying description, taken in connection with the accompanying drawings, in which like reference characters refer to like parts, and in which:

FIG. 3 is a schematic circuit diagram of a typical NAND (negative and) gate for explaining an example of one type of logical structure that may be utilized in the system of the invention;

FIG. 4 is a schematic block diagram of a control flip flop for explaining an example of one type of flip flop that may be utilized in the system of the invention;

FIG. 6 is a schematic block diagram of the memory phase counter flip flops for a first one of the memory banks and typical for the other memory bank of FIG. 2;

FIG. 8 is a schematic logical block diagram showing the write memory cycle flip flop utilized in the control network of a first one of the memory banks of FIG. 2 and typical of similar flip flops utilized in the other memory bank;

FIG. 9 is a schematic logical block diagram of the input-output cycle flip flops utilized in the control network of a first one of the memory banks of FIG. 2 and typical of similar flip flops utilized in the other memory bank;

FIG. 10 is a schematic logical block diagram of the arithmetic unit cycle flip flops utilized in the control network of the memory banks of FIG. 2;

FIG. 17 is a schematic logical diagram showing the selection networks of FIG. 2 for each of the memory banks;

FIG. 18 is a schematic logical diagram of gates for developing the arithmetic unit memory request signals in the processors of FIG. 1;

FIGS. 21 and 22 are schematic circuit and block diagrams of the program control unit sequencer flip flops utilized in each of the processors of FIG. 1 for controlling the sequences of operation during performance of program instructions;

FIG. 25 is a schematic circuit diagram of the gating structure in each processor for controlling the transfer of the contents of the program counter of FIG. 1 into the adder during a skip on indicator instruction;

FIG. 26 is a schematic circuit and block diagram of a typical interrupt flip flop that may be utilized in each of the processors of FIG. 1;

FIG. 29 is a schematic circuit and block diagram of the interrupt control flip flop X11 utilized in each of the processors of FIG. 1;

FIG. 33 is a schematic diagram of waveforms showing voltage as a function of time for further explaining the operation of indicator set and reset and skip on indicator instructions in each of the processors of FIG. 1;

FIG. 37 is a logical state table for explaining the relations of the executive control and executive function indicators of the system of FIG. 1 when utilizing two processors;

FIG. 38 is a schematic block diagram for explaining the floating executive operation with three interconnected processors in accordance with the principles of the invention.

Figure 1:
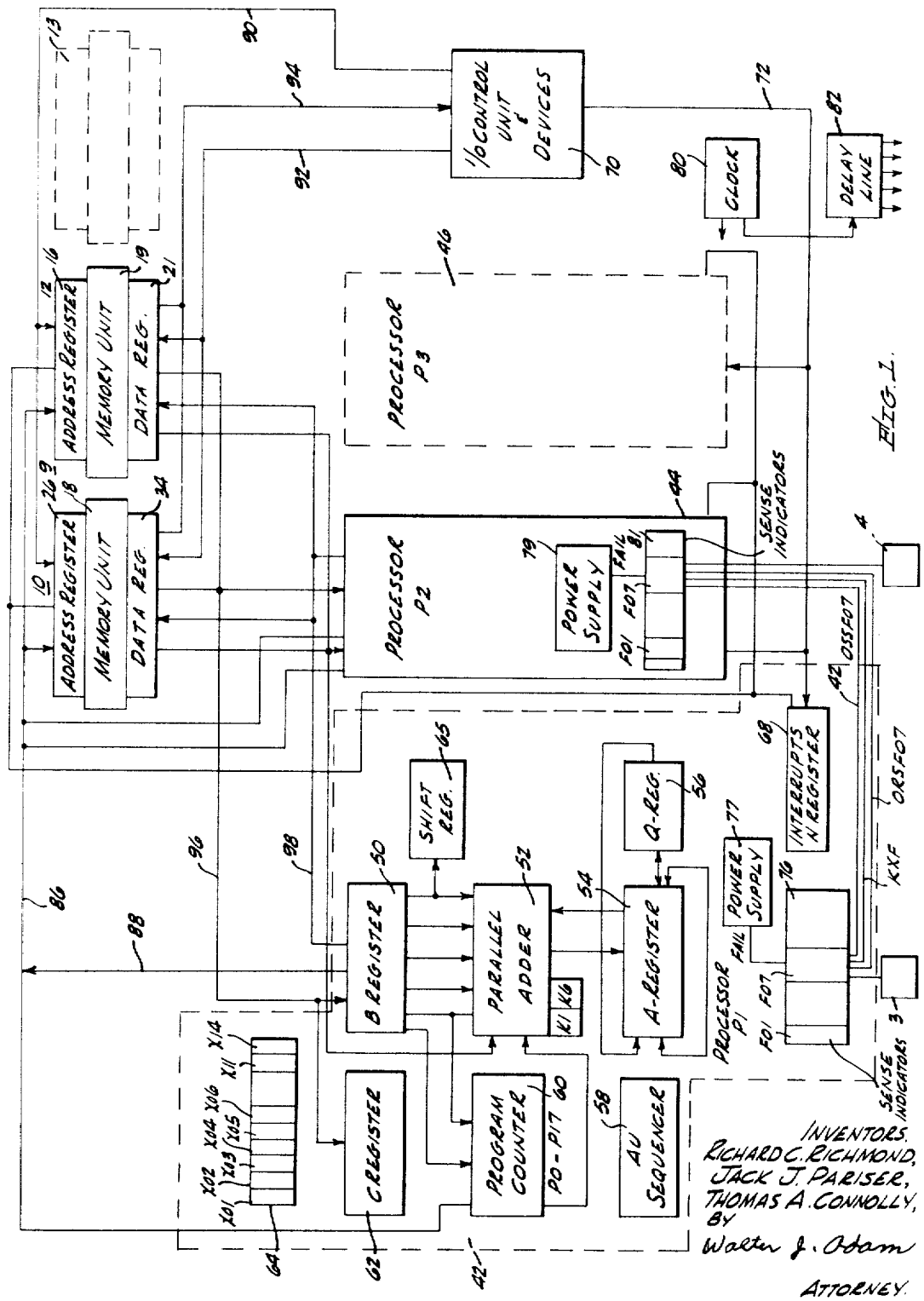
FIG. 1 is a schematic block diagram of the multiprocessor, floating executive control system in accordance with the principles of the invention.

Referring first to FIG. 1, the multiprocessor system in accordance with the principles of the invention includes a memory system 9 having memory banks 10 and 12, as well as additional banks in some arrangements in accordance with the invention as indicated by a dotted bank 13. The memory bank 10 and 12 may include magnetic memory array units 18 and 19, each storing information in magnetic cores, thin films, magnetic wires or other suitable storage arrangements. It is to be noted that the principles of the invention are applicable to processors utilizing other memory arrangements and the bank system is illustrated as one example of a type that may be utilized in accordance with the invention. As is well known in the art, the memory array units 18 and 19 have a plurality of cells or word positions at which either instruction words, external command words or data words are stored as binary states, for example. A selected portion of the memory array may be reserved for storage of predetermined words such as a transfer instruction word for entering a processor interrupt routine. The memory units 18 and 19 may include coincident half current selection circuits for changing all cores to a "zero" state during reading, and during writing the opposite state or "one" in cores of a selected word, for changing all cores to the "one" state except those that receive an inhibit pulse. Sense amplifiers may respond to interrogated cores to develop output signals. This type of memory arrangement is well known in the art and will not be explained in further detail.

An adress register 26 temporarily stores and applies binary word adresses to the memory array 18, and a data register 34 temporarily stores binary information which is either read from cores of a selected word position or is to be stored in the memory at a selected or addressed word position. An address register 16 and a data register 21 are provided in the bank 12 to function with the memory array unit 19. The system may operate with a plurality of processors such as 42, 44 and 46 also indicated as respective processors P1, P2 and P3. Each of the processors may be similar to the processor 42 which may include a buffer or B register 50, an adder 52 which may be a parallel adder for example, an accumulator or A register 54 and a Q register 56. The adder 52 may include control flip flops K1 and K6 which respectively control the transfer of plus "one" into the adder and transfer of the contents of the program counter 60 through the adder. An AU or arithmetic unit sequencer 58 may be associated with the arithmetic unit which includes the regi ters 50, 54 and 56 and the adder 52. The AU sequencer 58 develops timing or logical control signals for performing sequences of arithmetic operation, as are well known in the art.

The program control unit, which for purposes of explanation may be considered to be part of the arithmetic control unit, may include a program counter 60 having flip flops P0 to P17, a command or C register 62 and a PCU or program control unit sequencer 64. The PCU sequencer 64 may include a program control unit phase counter provided by flip flops X01 and X02, may include a program control unit level controller formed by state flip flops X03 to X06 and may include control flip flops X11 and X14. The command register 62 stores the code bits of an instruction word for developing signals to control performance of the instruction, as is well known in the art. A shift register counter 65 may be provided to store digital values which may be obtained from an instruction, to determine the number of iterations or arithmetic operations to be performed. Included in each processor such as 42 is an interrupt or N register 68 including a plurality of interrupt flip flops which may respond to interrupt signals through a composite lead 72 from an input-output unit 70 as well as to interrupt signals provided by the program being processed. A plurality of sense indicators 76 and 81 respectively provided in processors 42 and 44 and each including indicator flip flops F01 and F07 may be utilized during performance of normal instructions and for providing the floating executive control as will be described in further detail subsequently. The indicator flip flops F07 of processors P1 and P2 are interconnected by signals KXF, OSSF07 and ORSF07 which force the other processor to take or to relinquish executive control when the flip flop F07 in the first processor is respectively reset or set. Each processor such as P1 and P2 includes a power supply 77 and 79 which is connected to the corresponding flip flop F07 for applying a Fail signal thereto as an example of operation of a failing or faulty processor forcing another processor to assume executive control. Single mode-multimode switches 33 and 34 are coupled to the indicator flip flop F07 of respective processors P1 and P2 to control the processors to selectably operate as single independent processors or jointly with floating executive control.

The input-output unit 70 may supply new data to the data register 34 or receive data therefrom. It is to be understood that the input-output unit 70 may include suitable interface equipment and external devices such as magnetic tape units, punched tape units or magnetic disc units, for example. The system includes a clock 80 which in turn is coupled to a tapped delay line 82 for providing timing control pulses during the intervals between clock pulses which may be utilized to control a four phase read-write cycle in the memory in a conventional manner. The clock 80 may include a crystal oscillator and suitable pulse forming circuits as are well known in the art. Power may be supplied to the memory system from a conventional power supply (not shown).

The multiprocessor system of FIG. 1 operates to access the memory 9 from an address supplied either from the program control unit or from the input-output unit 70 which may include any number of external devices such as a magnetic or paper tape unit or a source of signals such as a radar or a communication system. The program control unit of processor P1 may access either memory bank 10 or 12 by supplying an address from the program counter 60 on a composite lead 86 or from the B register 50 on a composite lead 88, for example, and the input-output (I/O) unit 70 accesses the memory by supplying an address on a composite lead 90. Addresses are also supplied from processor P2 to both memory banks 10 and 12 on composite leads 86 and 88. Data is supplied to the data registers 34 and 21 from the input-output unit on a composite lead 92 and is received by the input-output unit on a composite lead 94. It is to be noted that the composite leads such as 86, 88 and data buses 96 and 98 each include a separate group of individual leads from each processor P1 and P2 as will be explained relative to FIG. 2.

Each processor operates in a conventional manner to derive instructions from a selected bank 10 or 12 at the address retained in the program counter 60 and in response to control signals developed by the PCU sequencer 64. The instruction word is then transferred from the data register 34 or 21 through the leads of the bus 96 into the B register 50 and the C register 62 of a selected processor, with the address of an operand being transferred to the B register 50. Certain bits of the instruction word may form the operating code as well as a code modifier and certain bits may form the operand address, as is well known in the art. The operand address, which may first be modified, is then transferred from the B register on the composite lead 88 to the address register 26 or 16 and an operand or data word is then transferred to the B register 50 on the leads of the bus 96 in response to the PCU sequencer 64 responding to the contents of the C register 62. For an external function request by the program control unit, a command word is transferred to the input-output unit 70 on the lead 94 from the address provided by the program control unit in the B register. The function of the program counter 60 is to retain the address of the next instruction to be accessed so that the contents thereof are incremented by one, such as being passed through the adder 52 under control of flip flops K1 and K6 after each instruction word is accessed. Data may be transferred from the arithmetic unit of either processor P1 or P2 to a selected data register of the memory 9 on the leads of the bus 98. The PCU sequencer 64 of both processors P1 and P2 develops control signals properly sequenced and timed with the clock 80 to perform the accessing of an instruction and the accessing of an operand from memory, as well as to control other computer operations. As is well known in the art, each of the storage and control registers includes flip flops with proper gating to respond to binary information signals, to timing signals and to control signals. Each processor may be programmed to normally access different memory banks 10 and 12 for normal operation with the executive program being stored in a portion of a selected memory bank common to all processors in the illustrated system. However, it is to be understood that a multiprocessor system with other types of memory systems such as a single large memory array may be utilized within the scope of this invention.

The next operation in the execution of the instruction such as an arithmetic instruction, is to perform an arithmetic operation on the operand in the B register 50, principally under the control of the AU sequencer 58. The result of the arithmetic operation may be stored in the A register 54 and the Q register 56 while the next instruction is derived from memory in response to the incremented address in the program counter 60. The operation of a digital computer to perform sequential steps and to perform arithmetic and other operations is of a type well known in the art.

Figure 2:
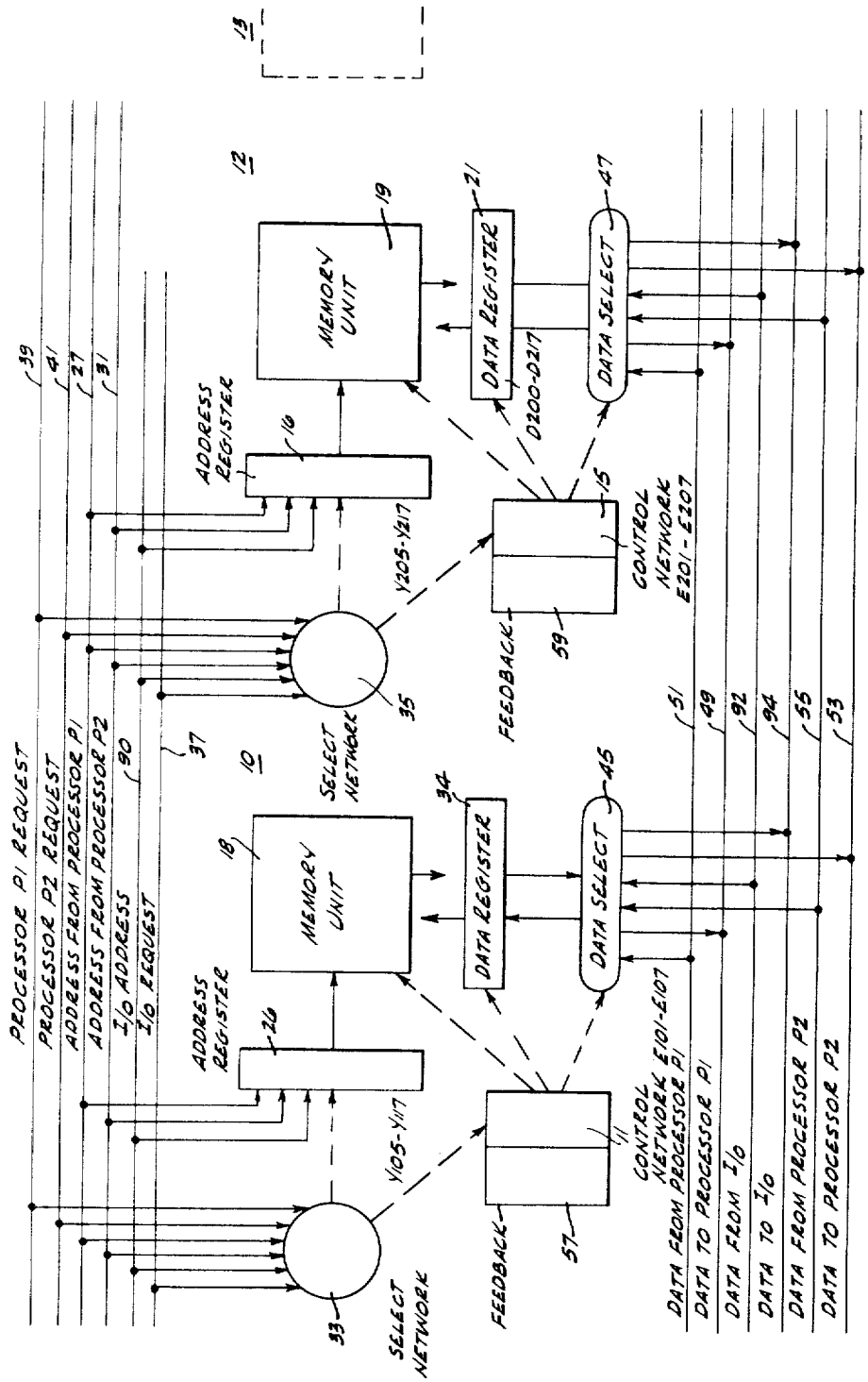
FIG. 2 is a schematic block diagram showing the banked memory system of FIG. 1 in further detail.

Referring now to FIG. 2 which shows the memory banks 10 and 12 in further detail, the address registers 26 and 16 of the respective banks 10 and 12 may both receive, after proper gating, 13 bits of address, for example, from an address bus 27 from processor P1, an address bus 31 from processor P2, both included in the composite lead 86, and the I/O address bus 90. Each bus includes a plurality of individual leads as will be explained subsequently. Selection or select networks 33 and 35 of respective banks 10 and 12 are each coupled to the address buses 27 and 31, the I/O address bus 90, an I/O request bus 37, a processor P1 request bus 39 and a processor P2 request bus 41. The selection networks 33 and 35 may respond to one bit of a 14-bit address for a two bank system or to two bits of a complete 15-bit address word for a three or four bank system, to energize the corresponding address register and to provide a priority to the memory requests. It is to be noted that depending on the number of additional memory banks that are utilized such as the bank 13, any desired number of bits may be utilized for application to the selection networks in accordance with the principles of the invention. Control networks 11 and 15 of banks 10 and 12 respectively include flip flops E101 to E107 and E201 to E207. In bank 10 for example, flip flops E101 and E102 form a mod-four memory phase counter, flip flop E103 forms a read-write control flip flop, flip flop E104 indicates that the memory cycle presently in process is an input-output cycle, flipflops E105 and E106 indicate that the memory cycle presently in process is the result of an arithmetic request and flip flop E107 serves to gate the output signals from the data register 34 to the I/O data bus 94.

Data selection networks 45 and 47 of respective banks 10 and 12 include gating arrangements which determine, receive and transmit that information that is directly associated with the corresponding memory bank. Each data selection network "ands" each bit of the corresponding data register with selected signals from the flip flops E104, E105, E106 and E107 of the corresponding control network. Each of the bit respective products from all banks or modules are "ored" together with E104 to pass output data signals to the common output lines of the bus 94. The products of E105 and the data bits are "ored" together to pass signals to the output lines of the data bus 49 of processor P1 and the products of E106 and the data bits are "ored" together to pass signals to the output lines of data bus 53 of processor P2. The input lines of the data bus 51 from processor P1 and of the data bus 55 from processor P2, both buses 51 and 55 being included in bus 98 of FIG. 1, are controlled in a similar manner, as will be subsequently explained in further detail. Feedback networks 57 and 59 provide control signa's such as EAU to the PCU sequencer 42 of the arithmetic unit to inhibit the arithmetic operation when the selected memory bank is accessed by a higher priority request or when the selected memory bank is currently in a memory cycle operation. The data registers 34 and 21 may respectively include flip flops D100 to D117 and D200 to D217 when the computer utilizes an 18-bit word, for example.

Referring now to FIG. 3, a typical NAND gate that may be utilized in the system in accordance with the invention will be explained before proceeding further with the multiprocessor system arrangement. A plurality of input terminals 110 and 112 are coupled through the cathode to anode paths of respective diodes 114 and 116 to a lead 120 which in turn is coupled through a resistor 122 to a +15 volt terminal 124. The lead 120 is also coupled through a resistor 126 to a lead 128 and in turn through a resistor 130 to a −15 volt terminal 132. The lead 128 is also coupled to the base of an npn type transistor 132 having an emitter coupled to ground and a collector coupled through a resistor 136 to a +5 volt terminal 138. A capacitor 140 may be coupled between the base of the transistor 134 and the lead 120 for reducing the rise time of the transistor when being biased into conduction. An output terminal 142 of the gate is coupled to the collector of the transistor 134. In operation, a false signal of 0 volts applied to either or both of the input terminals 110 and 112 causes current to flow from the terminal 124 through the resistor 122 and through the corresponding diode or diodes so that the transistor 134 is maintained in a nonconductive state and a +5 volt or true signal is provided on the terminal 142. When both of the input signals applied to the terminals 110 and 112 are true or +5 volts, the diodes 114 and 116 are biased out of conduction and a positive voltage is maintained at the base of the transistor 134 so that the transistor is biased into conduction. In this state, approximately ground potential or a false signal level is applied to the terminal 134.

The NAND gate of FIG. 3 functions as an "and" gate to develop a false output signal only when all of the input signals change from false levels to true levels. When the signals at all of the input terminals are normally maintained at true levels to provide a false signal at the output terminal 134, the gate functions as an "or" gate in response to any or all of the input signals going to a false level to develop a true output signal. When functioning as an inverter in response to a positive going input signal (that is with the output terminal normally at a true level), all unused input terminals of the gate of FIG. 2 may be coupled to a +5 voltage and the input signal going true at the single active input terminals causes the output signal to go false, which is similar to the operation of the NAND gate when performing an "and" function. When the NAND gate of FIG. 3 functions as an inverter in response to a negative going input signal (the output signal is normally false), all unused input terminals are coupled to a +5 volt level and the single active input terminal going false causes the output signal to go true which is similar to the operation of the NAND gate when functioning as an "or" gate. Thus, depending on whether the gate of FIG. 3 normally has a true output signal or a false output signal, the symbols utilized in the illustrated system are respectively that of an "and" function (a gate symbol with a straight input edge) and of an "or" function (a gate symbol with a concave input edge). It is to be understood that the system of the invention is explained utilizing NAND logic only for purposes of illustration and that the principles of the invention are applicable to any type of logical operation such as by utilizing "and" and "or" diode logic or NOR (negative or) inversion logic.

Referring now to FIG. 4, which shows a flip flop that may be utilized in the system of the invention, NAND gates 146 and 148 are provided to function as "or" gates with the output terminal of the gate 146 coupled to the false output terminal 149 as well as to the input terminal of the gate 148 and with the output terminal of the gate 148 coupled to a true output terminal 150 as well as to an input terminal of the gate 146. The toggle operation of the gates 146 and 148 is controlled by NAND gates 152 and 154 functioning as "or" gates and respectively coupled through delay lines 156 and 158 to input terminals of respective NAND gates 146 and 148. The output terminal of the gate 152 is coupled through leads 159 and 160 to an input terminal of the gate 154. A source of clock pulses at a terminal 162 and a source of control pulses C at a terminal 164 are also applied to the gates 152 and 154 which function as "or" gates. The informational input signals I are applied through leads such as 166 and 168 to the gate 152. For accommodating delays between the informational signals applied to the lead 160 and the clock signal, a capacitor 170 is coupled between ground and one input terminal of the gate 154. Unused input terminals to the gate 152 are coupled to a true or constant +5 volt level.

In operation, the flip flop of FIG. 4 is utilized with the informational input signals I on the leads such as 166 and 168 being normally true so that upon occurrence of the clock and control input signals, the signal on the lead 160 is false. The information input leads such as 166 and 168 are normally true in the absence of a coincidence condition at NAND gates (not shown) coupled thereto. The signal on the lead 159 is always true except at clock time when it becomes false to set the flip flop to the false state if all of the informational input signals are true and the control input signal is true. However, if one of the informational signals is false at clock time, the signal on the lead 159 is true and the flip flop is set to the true state or remains in the true state. For example, if the flip flop is in the false state with a true or +5 volt level signal at the terminal 149, the input signals to the gate 148 are both true so that a false signal at the terminal 150 is applied to the gate 146 along with the normally true signal on the lead 159. When one of the informational input signals on the leads such as 166 and 168 is false at clock time, the signal remains true on the lead 159. As a result, a false signal is developed by the gate 154 so that the gate 148 develops a true output signal. The gate 146 thus develops a false signal which maintains the gate 148 developing a true signal. The signal on the lead 159 remains true after clock time so that a false output signal is maintained by the gate 146 and a true output signal by the gate 148 to provide a stable "one" or set state for the flip flop. The flip flop operates in a similar manner when previously storing a true state and the informational input signals and the control input signal are all true at clock time to change the gate 146 to a state of having a positive or true output which is the stored "zero" or reset state. The delay lines 156 and 158 provide delays of the input signals so that information may be reliably interrogated from the terminals 149 and 150 at the beginning of a clock period and new information may be written therein during the same clock period. It is to be noted that the signal at the control input terminal 164 must be true at clock time for the flip flop to change state. If the signal at the control input terminal 164 is false at clock time, the flip flop remains locked in its previous state as the signal on the lead 159 remains true and the signal developed by the gate 154 remains at the true level. Also if the signal at the control input terminal 164 is maintained or provided at a true level, the flip flop is reset to the false state at clock time to function as a delay flip flop if all of the informational input signals are at true levels.

Figure 5:
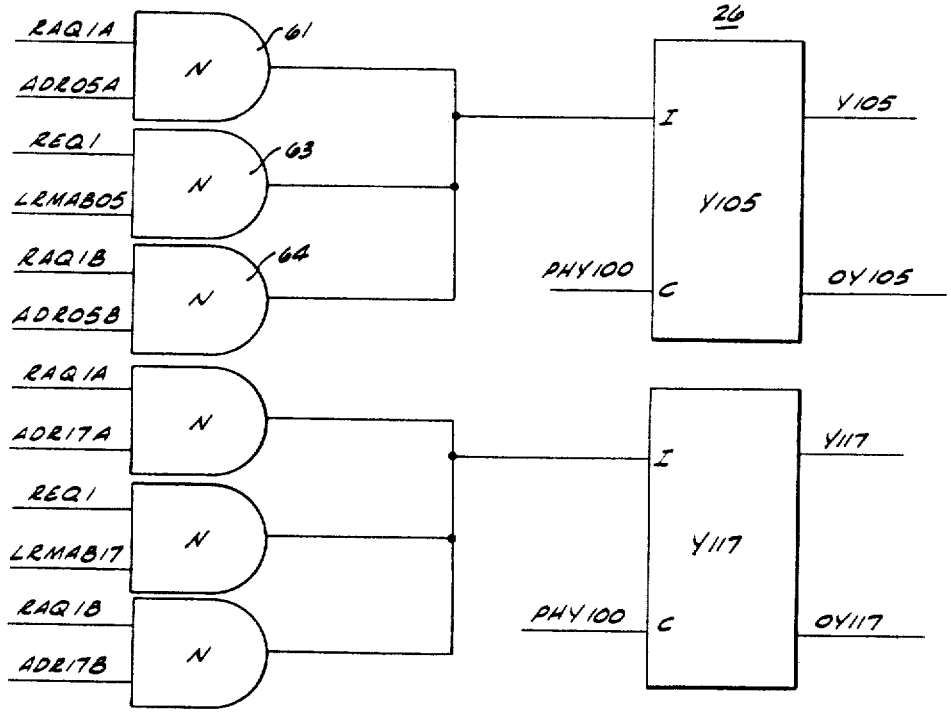
FIG. 5 is a schematic block diagram of the address register of FIG. 2 for one of the memory banks and typical for the other memory bank.

Referring now to FIG. 5, the address registers 26 and 16 of FIG. 2 each respectively include thirteen flip flops Y105 to Y117 and Y205 to Y217 which store the thirteen least significant bits of the fourteen bit memory address, for example, that may be utilized in accordance with the principles of the invention. The thirteen bit address represents a location reference for a particular word in each of the plurality of memory banks, the banks being selected by the selection networks 33 and 35 responding to the fourteenth and fifteenth next least significant bits of the address (the fourth and fifth most significant bits when related to the 18 bit computer word), for example, or to the fourteenth next least significant bit (the fifth most significant bit when related to the 18-bit computer word) in the illustrated arrangement utilizing only two memory banks. Although only the address register 26 is shown in FIG. 5, it is to be understood that the address register 16 is similar except the control signals are utilized from the selection network 35 rather than from the selection network 33. NAND gates 61, 63 and 64 functioning as "and" gates have their output terminals coupled together to provide an "or" function before passing a signal into the informational input terminal of the flip flop Y105. It is to be noted that with three of the NAND gates of FIG. 3 functioning as "and" gates to develop a false signal when the input signals are all true, a false signal provided by the conducting transistor of either or all of the three gates maintains a false signal at the common output lead. Thus, three NAND gates functioning as "and" gates and connected together as shown at flip flop Y105 provide an "or" function of the NAND gates. The gate 61 responds to an arithmetic request granted signal RAQ1A provided by processor P1 (the letter A indicating processor P1) and derived from the selection network 33 and to an arithmetic address signal ADR05A. The gate 63 responds to an input-output request granted signal REQ1 developed by the selection network 33 and to an input-output line receiver address signal LRMAB05 provided by the input-output unit. The gate 64 responds to an arithmetic request granted signal RAQ1B from processor P2 (the letter B indicating processor P2) and to an arithmetic address signal ADR05B from processor P2. Each flip flop Y106 through Y117 responds to a similar gating arrangement as does flip flop Y105 receiving the common signals RAQ1A, RAQ1B and REQ1. However, the gates at each flip flop receives different address signals such as ADR10A and ADR10B and LRMAB10 for flip flop Y110 and ADR17A, ADR17B and LRMAB17 for flip flop Y117.

In the address register 16 of the bank 12, the same addresses such as ADR05A, ADR05B and LRMAB05 and such as ADR17A, ADR17B and LRMAB17 are applied to flip flops Y205 and Y217 as indicated in FIG. 2. However, the control signals from the processors applied to the gates similar to gates 61, 63 and 64 of flip flops Y205 to Y217, are arithmetic request granted signals RAQ2A and RAQ2B for bank 12. The input-output granted signal for bank 12 is REQ2. The control signals applied to the control terminal of flip flops Y105 to Y117 and Y205 to Y217 are respectively PHY100 and PHY200 which are developed in response to the memory phase counters changing to the last phase of a memory cycle.

Referring now to FIG. 6, the control circuit 11 includes memory phase counter flip flops E101 and E102 with the flip flop E101 representing the least significant bit of the mod-four phase counter. The informational input terminals of the flip flop E101 respond to start memory cycle signals OSMC1A and OSMC1B, and input-output request granted signal OREQ1 and an external function signal OXTF1, one of which goes to a false level to start a memory cycle. During counting, the informational input terminal also responds to the memory phase count signal OPHY102 changing to a false signal. It is to be noted that the start memory cycle signals SMC1A and SMC1B change to true levels in response to a granted arithmetic unit request, by a memory bank and the signals REQ1 and XTF1 change to true levels in response to granted input-output and external function memory requests. The control input of the flip flop E101 responds to a true or constant +5 volt signal. The informational input terminal of the flip flop E102 is responsive to the signal OPHY101 and the control input terminal of the flip flop E102 is responsive to the signal E101 derived from the true output terminal of the flip flop E101. The arrangement of the flip flops E201 and E202 of the control circuit 15 for bank 12 is similar to the circuit 11 except the informational signals OSMC1A, OSMC1B, OREQ1, OXTF1 and OPHY102 of the flip flop E101 are respectively OSMC2A, OSMC2B, OREQ2, OXTF2 and OPHY202. Also, the signals PHY 101 and E101 into the flip flop E202 are PHY201 and E201.

Figure 7:
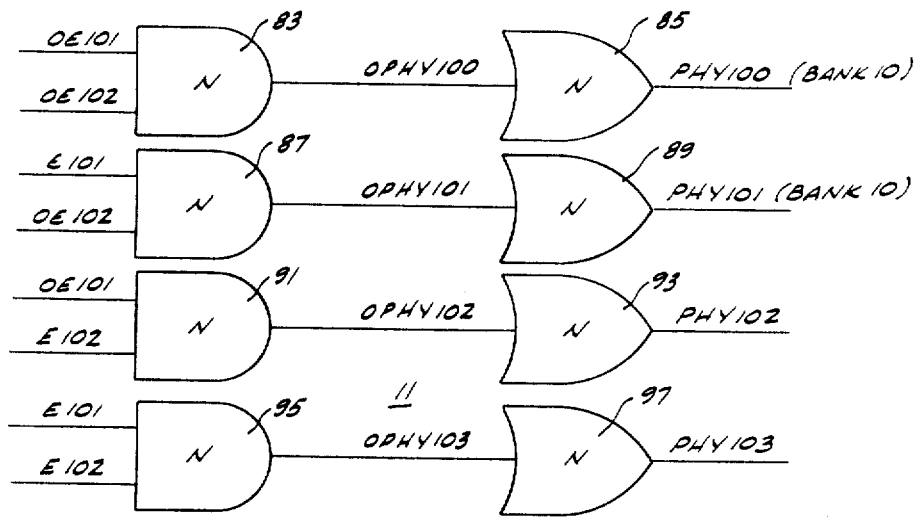
FIG. 7 is a schematic logical diagram of portions of the control circuits of FIG. 2.

Referring now to FIG. 7, the memory phase signals for the control circuit 11 of the bank 10 are developed by a gating structure including a NAND gate 83 functioning as an "and" gate and responsive to signals OE101 and OE102 to apply a signal OPHY100 to a NAND gate 85 functioning as an inverter to develop a signal PHY100. A NAND gate 87 functioning as an "and" gate develops a signal OPHY101 in response to signals E101 and OE102 with the signal OPHY101 being applied to a NAND gate 89 functioning as an inverter to develop a signal PHY101. A NAND gate 91 functioning as an "and" gate responds to signals OE101 and E102 to develop a signal OPHY102 which is applied through a NAND gate 93 functioning as an inverter to develop a signal PHY102. A NAND gate 95 functioning as an "and" gate responds to signals E101 and E102 to develop a signal OPHY103 which is applied through a NAND gate 97 functioning as an inverter to develop a signal PHY103. The gates for developing the phase signals of the control circuit 15 are similar to that of FIG. 7 except the input signals are derived from flip flops E201 and E202 and the phase signals are designated PHY200, PHY201, PHY202, and PHY203.

Also included in the control circuit 11 as shown in FIGS. 8, 9 and 10 are write memory cycle flip flop E103, input-output cycle flip flop E104, AU cycle flip flops E105 and E106 for respectively designating processors P1 and P2 and input-output data switch flip flop E107. The flip flop E103 responds at its informational input terminal to signals OSAE103B, OSAE103A and OSAE103 developed by respective NAND gates 99, 101 and 103 functioning as "and" gates. The gate 99 receives signals MYC10B indicating a store condition request and developed in response to the program control unit sequencer of processor P2 and a start memory cycle signal SMC1B in response to the signal OSMC1B from processor P2. The gate 101 receives input signals MYC10A indicating a store condition request by the program control unit or processor P1 and to a start memory cycle signal SMC1A developed by an inverter gate in response to the signal OSMC1A from processor P1. The gate 103 responds to an input-output request granted signal REQ1 and to an input-output write request signal MWR, the latter signal being developed by the input-output unit 70. The signal PHY100 is applied to the control input of the flip flop E103 so that the flip flop is either set or reset at this phase time. The flip flop E103 is set to the "one" state to inhibit the signal in the sense amplifiers (not shown) from passing to the data register when it is desired to write new information from the data register into the memory. The informational input terminal of the flip flop E104 responds to signals OXTF1 representing an external function request and OREQ1 representing an input-output granted request. The control input terminal of the input-output cycle flip flop E104 is responsive to the memory phase timing signal PHY100. In order that data is not gated to the input-output unit 70 until one clock time after the flip flop E104 is set, the input-output data switch flip flop E107 has its informational input terminal responsive to the signal OE104 and its control input terminal maintained at a true or +5 volt level. The AU cycle flip flop E105 for controlling processor P1 responds at its informational input terminals to a program control unit request granted signal OSMC1A and responds at its control input terminal to the signal PHY100. For responding to the processor P2, the flip flop E106 responds to the signal OSMC1B at its informational input terminal and to PHY100 at its control terminal. In the control circuit 15, the signals and associated gates of flip flops E203, E204, E205, E206 and E207 are similar to E103, E104, E105, E106 and E107 except developing output signals E203, E204, E205, E206 and E207 and being responsive to the control signals in bank 12 such as REQ2, OREQ2, OSMC2A, OSMC2B and PHY200.

Figure 11:
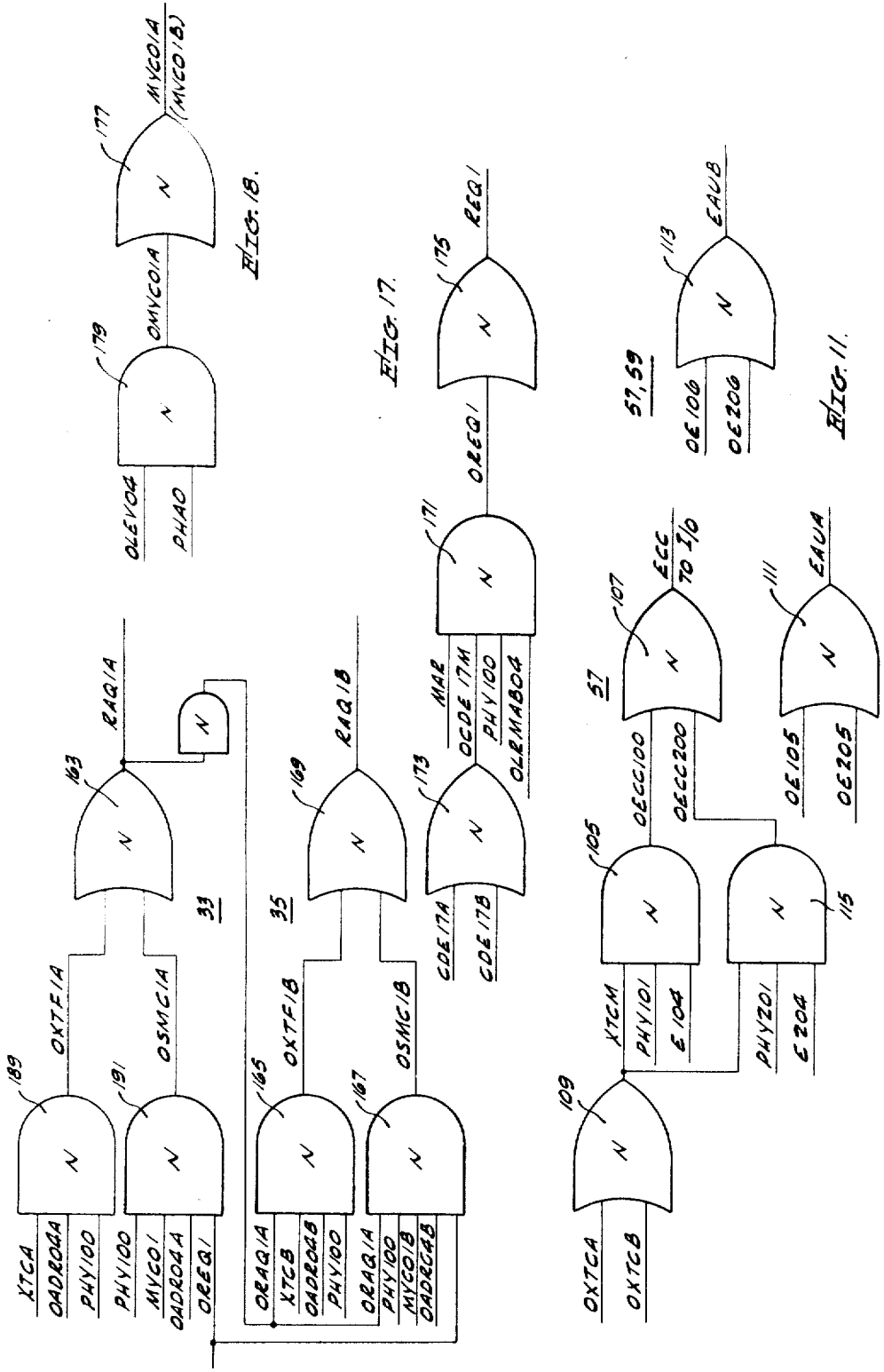
FIG. 11 is a logical block diagram showing a portion of the feedback units of FIG. 2.

Referring now to FIG. 11, the feedback networks 57 and 59 include circuits for notifying the input-output unit that it is granted an external function operation and for notifying the program control unit of both processors that an arithmetic unit cycle has been granted. A NAND gate 105 of the feedback circuit 57 functioning as an "and" gate responds to signals XTCM, PHY101 and E104 of bank 10 to apply a signal OECC100 to a NAND gate 107 functioning as an "or" gate. A NAND gate 109 functioning as an "or" gate responds to signals OXTCA and OXTCB which are external function requests from respective processors P1 and P2 to develop the signal XTCM. A similar signal from the feedback circuit 59, OECC200, is applied to the gate 107 which develops a signal ECC indicating that an external command is coming to the input-output unit. A NAND gate 115 of the feedback network 59 responds to signals XTCM, PHY201 and E204 to develop the signal OECC200. A NAND gate 111 functioning as an "or" gate responds to signals OE105 and OE205 from respective banks 10 and 12 to develop a feedback signal EAUA indicating to the program control unit phase counter of processor P1 that a memory cycle request has been granted. A NAND gate 113 functioning as an "or" gate responds to signals OE106 and OE206 to develop a signal EAUB indicating to processor P2 that a memory cycle request is granted.

Figure 12:
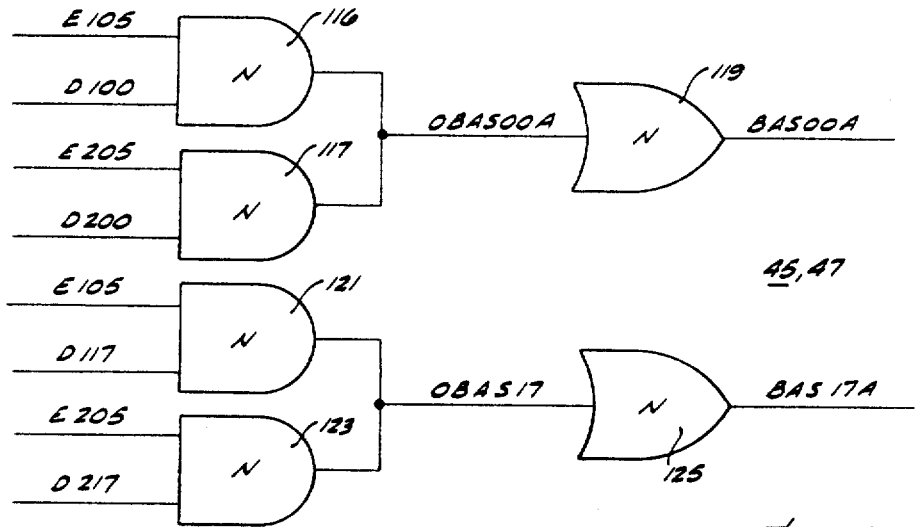
FIG. 12 is a logical block diagram showing a portion of the data selection networks of FIG. 2 for gating data to the arithmetic unit bus.

Referring now to FIG. 12, the data selection networks 45 and 47 for applying data to the arithmetic unit buses of processor P1 include NAND gates 116 and 117 of respective networks 45 and 47 functioning as "and" gates and respectively responsive to signals E105 and D100 and to signals E205 and D200 to apply a data signal OBAS00A to a NAND gate 119 functioning as an inverter gate which develops the data signal BAS00A. The signals D100 and D200 are provided by the flip flops at the least significant bit positions of the respective data registers 34 and 21 and the signal BAS00A represents the data signal applied to one of the leads of the arithmetic unit data bus 49 for processor P1 (FIG. 2). Similar gating arrangements of the other 17 bits of the 18 bit computer word develop signals BAS01A to BAS17A. NAND gates 121 and 123 respectively responsive to signals E104 and D117 and signals E204 and D217 develop the signal BAS17A at the output terminal of a gate 125.

Figure 13:
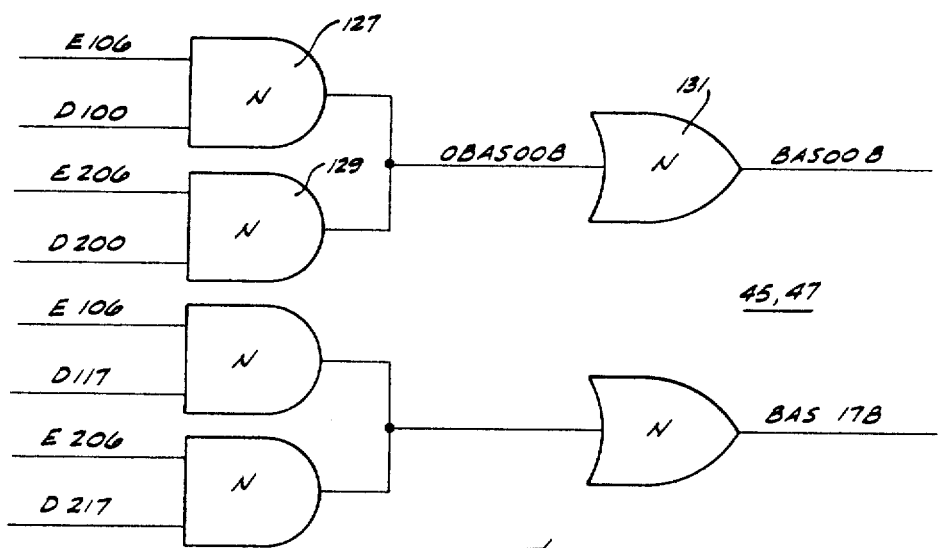
FIG. 13 is a logical block diagram showing a portion of the data selection networks of FIG. 2 for gating data to the input-output unit bus.

Referring now to FIG. 13, the data is transferred to processor P2 from the data selection networks 45 and 47 by an arrangement similar to that of FIG. 12. NAND gates 127 and 129 functioning as "and" gates respectively respond to signals E106 and D100 and to signals E206 and D200 to develop the signal OBAS00B which is inverted in a gate 131 to form the signal BAS00B which in turn is applied to a lead of the bus 53. The other signals BAS01B to BAS17B are developed in a similar manner and applied to leads of the bus 53. A gating structure (not shown) similar to that of FIG. 13 except responsive to flip flop E107 (FIG. 9), may be utilized to transfer data to the input-output unit on the bus 94.

Figure 14:
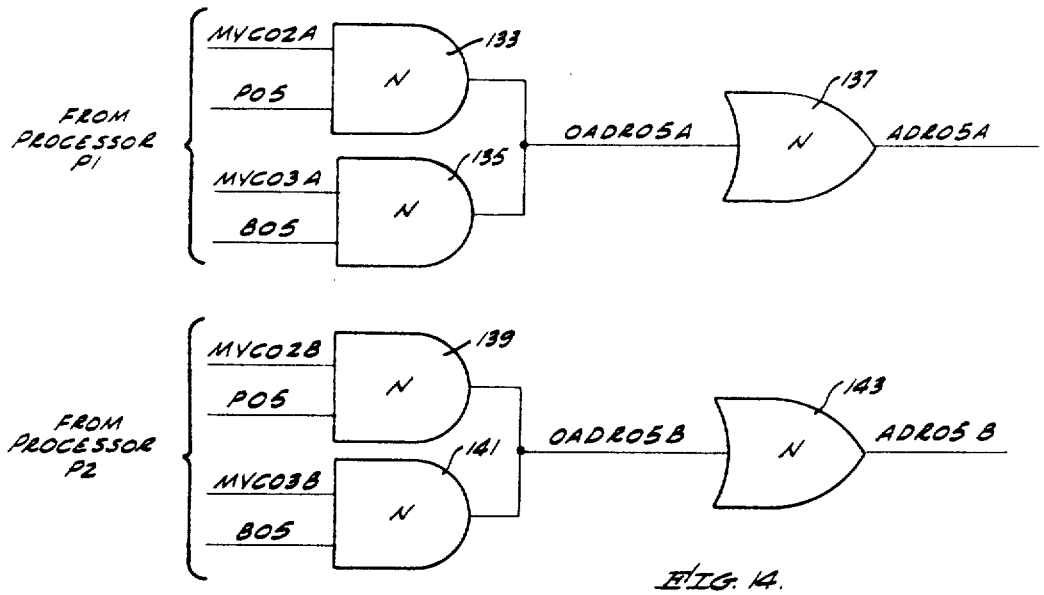
FIG. 14 is a logical block diagram of a portion of the address register of each memory bank of FIG. 2 for gating the address from the arithmetic unit and input-output unit sources.

Referring now to FIG. 14, the address signal provided to the input gates of both of the memory banks 10 and 12 by the arithmetic unit and which has a bit position such as O5, is responsive to the address stored in either the program counter (FIG. 1) of one of the processors or in the B register of one of the processors. NAND gates 133 and 135 functioning as "and" gates respectively respond to signals from processor P1, MYCO2A and PO5 from the program counter and to signals from processor P1, MYCO3A and BO5 from the B register, to apply a signal OADRO5A to a NAND gate 137 functioning as an inverter gate to develop a signal ADRO5A. One lead of the AU address bus 27 from processor P1 (FIG. 2) receives the least significant bit of the address or the signal ADRO5A of the 13-bit address, that may be applied to the address registers. For responding to an address from processor P2, NAND gates 139 and 141 receive signals MYCO2B and PO5 and MYCO3B and BO5, all from processor P2, to develop the signal OADRO5B which is inverted in a gate 143 to develop the address signal ADRO5B. The signals MYCO3A and MYCO3B are control signals developed by the processors for transferring data from the B register to the address bus. A gating structure similar to that of FIG. 14 is provided in each processor P1 and P2 for each of the other bit positions 6 through 17 of the total 13-bit common memory address. The bank selection portions of the address such as ADRO4A and ADRO4B are also developed by a similar gating structure in each processor. It is to be again noted that in the illustrated arrangement only 14 bits are utilized for addressing the memory because only 2 banks are controlled, but that 15 bits or more may be utilized in accordance with the principles of the invention. The address from the input-output unit is applied from external devices, for example, to 14 leads of the I/O address bus 90 of FIG. 2, with thirteen bits being applied to the gates at the address registers (FIG. 5) as signals such as LRMABO5 (FIG. 17) and with one bit being applied to the selection networks 33 and 35.

Figure 15:
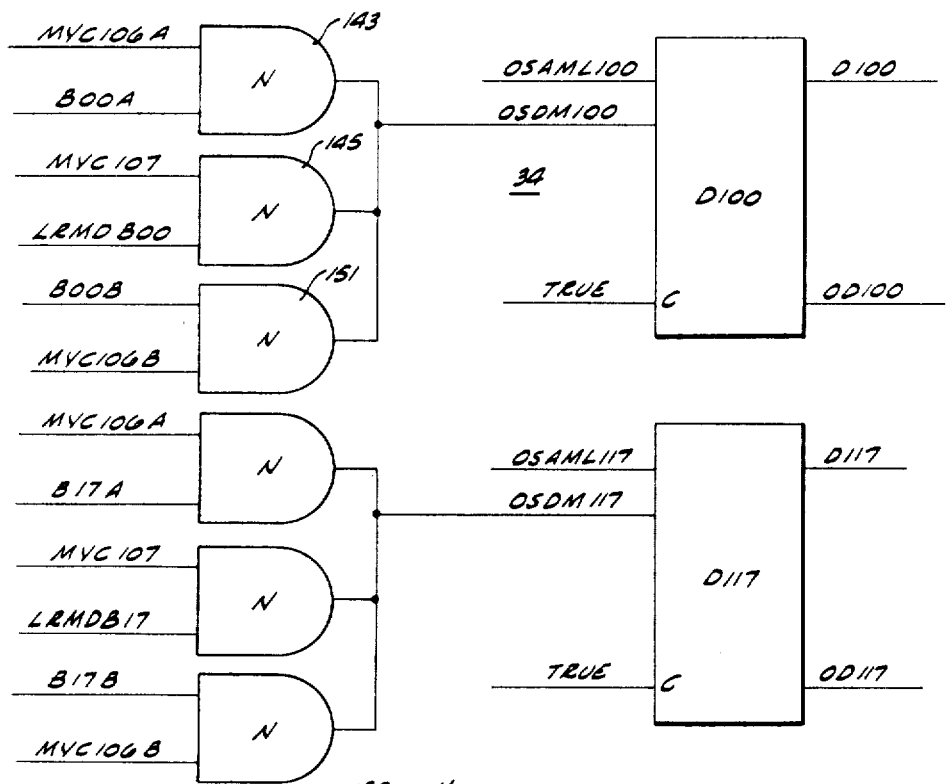
FIG. 15 is a schematic logical block diagram of the data register in a first one of the memory banks and typical of the data register in the other memory bank of FIG. 2.
Figure 16:
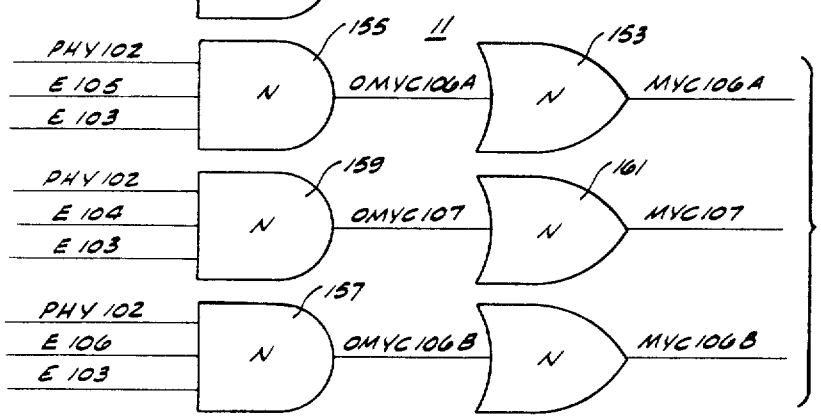
FIG. 16 is a logical diagram showing gates for developing control signals to be utilized in the data registers of the memory banks of FIG. 1.

Referring now to FIG. 15, the data register 34 of the memory bank 10 includes flip flops D100 to D117. The flip flop D100 responds at its informational input terminals to a signal OSAML100 developed by sense amplifiers (not shown) when information is being read from the memory and responds to a signal OSDM100 when new data is being applied to the data register from either the arithmetic unit or the input-output unit. A NAND gate 143 functioning as an "and" gate responds to a signal BOOA from the B register of processor P1 and a signal MYC106A indicating a request from processor P1 for an arithmetic unit write cycle (FIG. 16). A NAND gate 145 functioning as an "and" gate responds to an input-output unit data signal LRMDBOO and to a signal MYC107 representing a request for an input-output unit write cycle (FIG. 16). A NAND gate 151 functioning as an "and" gate responds to signals BOOB and MYC106B from the processor P2. The control terminal of the flip flops D100 to D117 are coupled to a true or +5 volt signal. A similar gating structure is provided at each flip flop D101 to D117 except the arithmetic and input-output unit data signals are of the corresponding bit levels. The flip flops D200 to D217 of the data register 21 of the bank 12 are similar to those shown in FIG. 15 except control signals MYC206A, MYC206B and MYC207 (not shown) are applied thereto instead of signals MYC106A, MYC106B and MYC107.

Referring now to FIG. 16, the arithmetic unit write timing signal for processor P1, MYC106A as provided by the control network 11 is developed by a NAND gate 153 responding to a signal OMYC106A. A NAND gate 155 functions as an "and" gate in response to a memory read time phase signal PHY102, an arithmetic cycle signal E105 for processor P1 and a write cycle signal E103 to develop the signal OMYC106A. A NAND gate 157 functioning as an "and" gate responds to signals PHY102, E106 indicating processor P2, and E103 to develop the signals OMYC106B and MYC106B. For developing an input-output unit write timing signal MYC107, a NAND gate 159 functions as an "and" gate in response to a memory phase signal PHY102, an input-output cycle signal E104 and a write cycle signal E103 to develop a signal OMYC107 which is inverted in a NAND gate 161 to form the signal MYC107. The signals MYC106A, MYC106B and MYC107 are developed in the control network 11 and signals MYC206A, MYC206B and MYC207 for the bank 12 are developed in the control network 15 by similar gating structure (not shown).

Referring now to FIG. 17, the selection network 33 includes gate 189 and 191 functioning as "and" gates with the gate 189 responding to an external function request signal XTCA (FIG. 22) from the arithmetic unit, a memory phase signal PHY100 which occurs at the end of a memory cycle and the gate 191 responding to the signals PHY100, an arithmetic unit memory request signal MYCO1 and a signal OREQ1 which is true when a higher priority input-output request is not granted. Also, both gates 189 and 191 respond to the most significant bit of the address being in the "zero" state, that is, the signal OADRO4A, which state represents a memory request for bank 10. A gate 163 functioning as an "or" gate receives input signals OXTF1A from the gate 189 and signals OSMC1A from the gate 191 to develop the arithmetic unit request granted signal RAQ1A for bank 10 and for processor P1. To develop an arithmetic unit request granted signal for processor P2, NAND gates 165 and 167 functioning as "and" gates respectively respond to signals ORAQ1A to provide a lowest priority, XTCB, OADRO4B and PHY100, and to signals ORAQ1A, PHY100, MYCO1B, OADRO4B and OREQ1. A NAND gate 169 functioning as an "or" gate responds to signals OXTF1B and OSMC1B to develop the request granted signal RAQ1B for processor P2. The selection network 33 also includes a gate 171 functioning as an "and" gate and responsive to an input-output memory request signal MAR, a signal OCDE17M which provides the condition that an external function request is not present, the phase timing signal PHY100, and the address bit for bank 10 from the input-output unit, OLRMABO4 to develop a signal OREQ1. A NAND gate 173 functioning as an "or" gate responds to external function request signals CDE17A and CDE17B to develop the signal OCDE17M. A NAND gate 175 functioning as an inverter responds to the signal OREQ1 to develop the input-output request granted signal REQ1 for the bank 10 which signal is applied to the input-output unit 70 (FIG. 1).

The bank selection network 35 for bank 12 includes a gating structure (not shown) responsive to similar signals except PHY200 and OREQ2 instead of PHY100 and OREQ1 to develop arithmetic request granted signals RAQ2A and RAQ2B for bank 12. The input-output request granted signal REQ2 is developed for bank 12 by a gating arrangement similar to that of bank 10.

Referring now to FIG. 18, a control signal MYC01A which is a memory request signal provided by the program control unit in processor P1 is developed by a NAND gate 177 functioning as an inverter and responsive to a signal OMYC01A. A NAND gate 179 functioning as an "and" gate develops the signal OMYC01A in response to signals OLEV04 and PHA0 when the processor P1 is in the proper level or state to perform a memory request. A signal MYC01B for processor P2 is developed by a similar gating arrangement (not shown) in response to signals OLEV04 and PHA0 from processor P2.

Figure 20:
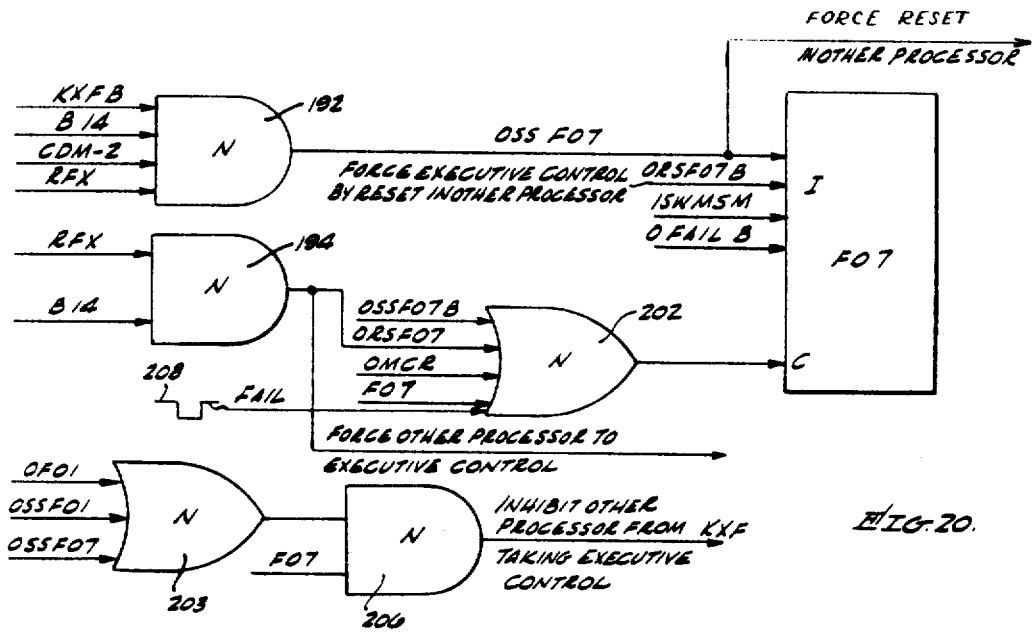
FIG. 20 is a schematic block and circuit diagram of the executive control indicator flip flop that may be utilized in each of the processors of FIG. 1 for controlling the floating executive operation in accordance with the invention.
Figure 19:
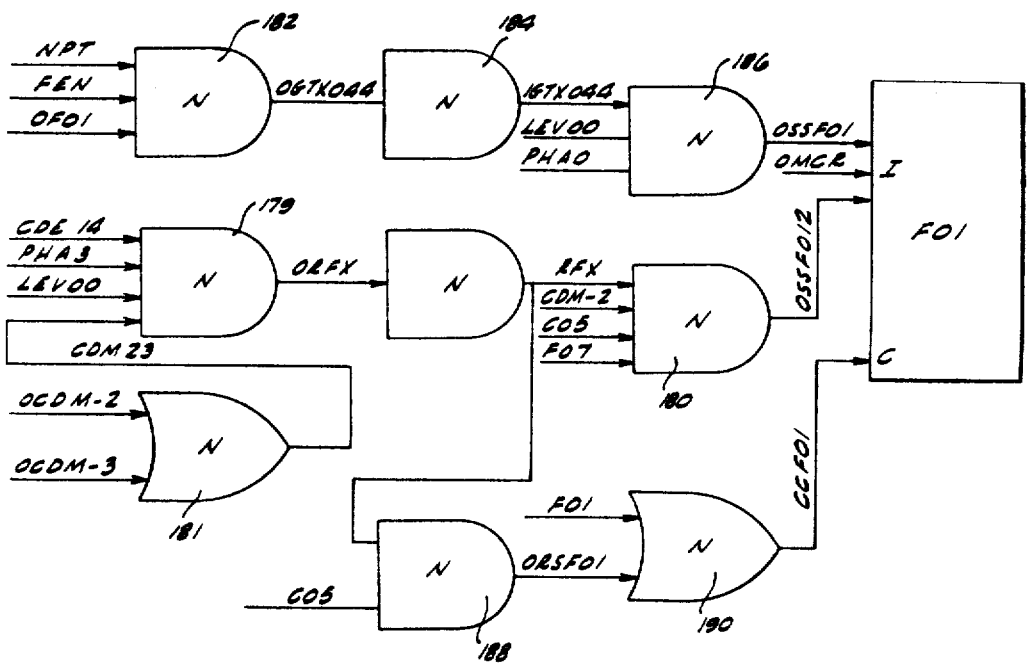
FIG. 19 is a schematic circuit and block diagram of the executive function indicator flip flop that may be utilized in each of the processors of FIG. 1 for controlling the floating executive operation in accordance with the invention.

Referring now to FIGS. 19 and 20, the executive function flip flop F01 and the executive control flip flop F07 of the sense indicator such as 76 (FIG. 1) will be explained further. It is to be noted that similar indicator flip flops are utilized in each processor P1 and P2 such as in sense indicator 81 (FIG. 1), and in processor P3 when an additional processor is provided in the system. The flip flop F01 performs the function in each processor of preventing the other processor from taking executive control until the processor having executive control completes the executive program or routine or completes an interrupt routine. The flip flop F01 is set to the true state in response to a set instruction which may be derived from memory during a routine to obtain executive control. A signal RFX which is an instruction set or reset term, a signal CDM-2 which is the code modifier for a set instruction and the signal C05 which at a true state represents a "one" in the predetermined position of the instruction word for designating indicator flip flop F01, and an executive control term F07 indicating that the processor has executive control, are applied to a NAND gate 180 functioning as an "and" gate to develop a false signal when all of the input signals are at a true level for setting the executive function indicator to the true state. The flip flop F01 also set to the true state in response to an interrupt request when the flip flop F01 is in the false state as a signal NPT indicating an interrupt request, a signal FEN which is developed by the arithmetic unit when an arithmetic operation is completed to transfer control back to the program control unit and a signal OF01 are applied to a NAND gate 182 functioning as an "and" gate which in turn is coupled through an inverter gate 184 to a NAND gate 186 functioning as an "and" gate which responds at the proper time as determined by signals LEV00 and PHA0 to set the executive function indicator. The flip flops X06 to X03 are decoded to provide the level 00 and the program control unit phase counter flip flops X02 and X01 control the phase of the four phase cycle. The signal NPT is true whenever an interrupt request is pending, the processor has executive control and is not performing an executive function, the signal FEN is true at the completion of an instruction by the arithmetic unit, the signal LEV00 is true at the completion of a previous instruction and the signal PHA0 is true when the program control unit phase counter (flip flops X01 and X02) is in its initial state of a mod 4 count. The flip flop F01 may also be set in response to a master clear signal OMCR being true. It is to be noted that in one arrangement in accordance with the invention, all flip flops including F07 are reset during a master clear signal except flip flop F01. A NAND gate 179 functioning as an "and" gate develops the signal ORFX (which is the inverted form of RFX) in response to an instruction code signal CDE14, a program control unit timing signal PHA3, the PCU level signal LEV00 and a code modifier signal CDM23. A NAND gate 181 functioning as an "or" gate responds to code modifier signals OCDM-2 and OCDM-3 which are respectively the code modifiers for a set and a reset instruction to develop the signal CDM23. A code modifier is utilized with the 5 bit instruction code to increase the available number of processor instructions.

The flip flop F01 is reset when in the true state in response to a set or reset instruction in the processor. A decoded set or reset instruction signal RFX and a signal C05 from the command register designating indicator flip flop F01 are applied to a NAND gate 188 functioning as an "and" gate which in turn applies a signal ORSF01 to a NAND gate 190 functioning as an "or" gate which resets the flip flop F01. The signal F01 is applied to the gate 190 to provide the control term during setting of the flip flop F01.

Referring now to FIG. 20, the executive control flip flop F07 in each processor performs the function of assuming executive control for that processor in response to a set instruction while removing executive control from the other processor and performs the function of responding to a reset instruction or to a failure condition to force another processor to assume executive control. A NAND gate 192 functioning as an "and" gate responds to a signal B14 which is derived from a "one" in the position of the set instruction word corresponding to indicator flip flop F07, a code modifier signal CDM-2 for the set instruction, the signal RFX derived from a set or reset instruction (FIG. 19) and to a signal KXFB from another processor which is true when the other processor is not in the condition of executive control or executive function. The signal OSSF07 is applied from the gate 192 to an informational input terminal of the flip flop F07 in that processor as well as to the flip flop F07 (at a gate 202) in all other processors to force reset thereof. A signal ORSF07B is also applied to the flip flop F07 to force that processor to take executive control as a result of an instruction reset of the flip flop F07 in another processor. It is to be again noted that the letter B on the end of terms such as OSSF07B and ORSF07B indicates that the signal is derived from a similar gate in another processor. Also in order to provide single mode or multimode operation, a signal ISWMSM (from switches 3 and 4 of FIG. 1) which is maintained continually at a false level during a selected single mode operation is applied to set the flip flop F07 and maintain that flip flop in each processor P1 and P2 in the true state with continual executive control.

The flip flop F07 is reset in response to a reset instruction by the signal RFX and a signal B14 designating flip flop F07 with the signals being applied to a NAND gate 194 functioning as an "and" gate to develop a signal ORSF07. A NAND gate 202 functioning as an "or" gate responds to the instruction reset signal ORSF07, to a signal OSSF07B from another processor taking over executive control and resetting the processor from which executive control is taken. A master clear signal OMCR and the signal F07 from the true output terminal of the flip flop F07 are also applied to the gate 202 to provide a control input for resetting the flip flop and for setting the flip flop when the gate 192 is energized. A NAND gate 203 function as an "or" gate responds to signals OF01, OSSF01 and OSSF07 to apply a signal in combination with a signal F07 to a NAND gate 206 functioning as an "and" gate to develop the signal KXF which is applied to the gate such as 192 in the other processor or processors to inhibit the other processors from assuming executive control.

The signals OF01, OSSF01 and OSSF07 are normally applied to the gate 203 at true levels and any or all of the signals going false applies a true signal to the gate 206 which in combination with the signal F07 being at a true level, applies the signal KXF to the other processor at a false level to inhibit the other processor from assuming executive control. If the signal OF01 is false, the first processor has executive function and the other processor is inhibited from assuming executive control. For the condition of simultaneous requests for executive control and excutive function by processors P1 and P2 and the signal OSSF01 goes false in both processors, the gate 203 prevents the other processor from setting F07. Also for the condition of simultaneous requests for executive control when one processor that has executive control (F07 is true) develops a request signal OSSF07 to set the executive control flip flop during the same clock period that the processor that does not have executive control changes to a state to develop a signal OSSF07, the processor that previously had executive control maintains executive control, as the signal OSSF07 in the processor not having executive control is prevented from going true by KXFB. Thus, the flip flop F07 remains set in the processor that has executive control.

The gate 202 also responds to a power fault, or fail signal of a waveform 208 from a power failure in the power supply 77 or 79 or from a memory protection circuit of the memory or portion of memory utilized by the processor, to reset flip flop F07 and force the other processor to assume executive control. A signal OFAILB is applied to the informational input terminal of the flip flop F07 from the other processor so that failure in one processor causes the other processor to assume executive control. The fail condition of the waveform 208 is not to be limited to a power failure as any type of processor or memory failure condition or the results of any routine such as a test routine may be utilized to cause the other processor to assume executive control within the principles of the invention. It is to be noted that a reset instruction may control the gate 194 to force another processor to assume executive control when a long interrupt program is being entered by the first processor.

Figure 22:
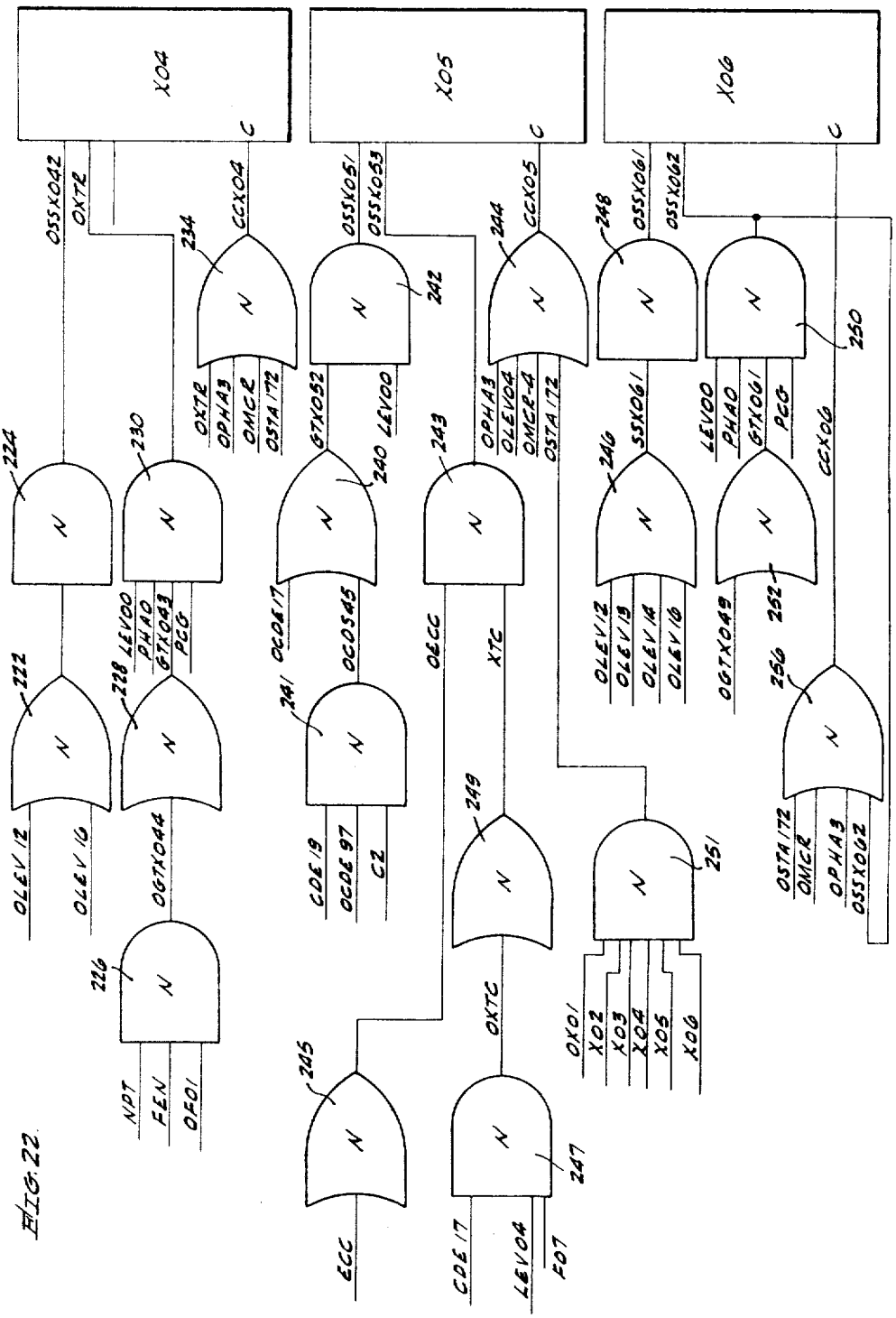

Referring now to FIGS. 21 and 22, the PCU sequencer 64 includes flip flops X01 to X06 to provide the timing and control within the program control unit. As discussed previously, the program control unit performs the function of deriving instructions from memory, responding to the instruction to derive an operand from memory and then passing control to the arithmetic unit. Program control unit phase counter flip flops X01 and X02 developing phase counts PHA0, PHA01, PHA02, and PHA03 are synchronized with the phase counter (E101, E102 of FIG. 6) of the memory unit having a four phase read-write cycle of phases PHY01, PHY02, PHY03 and PHY04. Flip flop X01 which represents the least significant bit position of the four phase counting cycle is responsive at its informational input terminals to signals OSMC1A and OPHA2 and at its control input terminal to a true signal. The signal OSMC1A is a start memory cycle developed by the states of the flip flop X03 to X06 in processor P1. The flip flop X02 is responsive at its informational input terminal to a signal OPHA1 and at its control input terminal to a signal X01 derived from the true output terminal of the flip flop X01. The counter of flip flops X02 and X01 is decoded in a conventional manner similar to that shown in FIG. 7 and develops the signals PHA00, PHA01, PHA02 and PHA03.

The program control unit level counter includes flip flops X03 to X06 which respond to the decoded instruction stored in the C register 62, to the phase count of flip flops X01 and X02 as well as to other control signals to control the particular type of memory cycle desired by the program control unit. For example, an instruction cycle is provided when flip flops X06, X05, X04 and X03 are in states 0000 to develop a signal YEV00. The following table lists the level counter codes of the PCU sequencer:

| Level | X06-X03 | Operation |
| --- | --- | --- |
| 00 | 0000 | Instruction. |
| 01 | 0001 | Index Register. |
| 02 | 0010 | Arithmetic Unit Operand. |
| 03 | 0011 | Add. |
| 04 | 0100 | Idle. |
| 05 | 0101 | Replace Index. |
| 12 | 1010 | Derive Real Time Clock. |
| 13 | 1011 | Replace Real Time Clock. |
| 14 | 1100 | Derive Elapsed Time Clock. |
| 15 | 1101 | Replace Elapsed Time Clock. |
| 16 | 1110 | Interrupt Return Register. |
| 17 | 1111 | Interrupt Entrance Register. |

The flip flops X03 to X06 in each processor are set and decoded by a conventional decoding circuit (not shown) as is well known in the art and not all of the control operations will be explained in detail because they are of a type well known in the art. The flip flop X03 responds at its informational input terminals to a signal OSSX032. A NAND gate 212 functioning as an "or" gate responds to signals OLEV12, OLEV14 or OLEV16 which represent clock and interrupt operations to apply a signal SSX032 through an inverter gate 214 to develop the signal OSSX032. The control input terminal of the flip flop X03 responds to a signal CCX03 developed by a NAND gate 216 functioning as an "or" gate and responding to signals OPHA3, OMCR and OSTA172. A NAND gate 218 functioning as an "and" gate responds to signals LEV17 and PHA2 respectively representing an interrupt entrance register cycle and the third phase of the count of X01 and X02 to develop the state 172 signal OSTA172 for that processor.

The informational input terminals of the flip flop X04 as shown in FIG. 22 respond to signals OSSX042 and OXTR. A NAND gate 222 functioning as an "or" gate responds to a signal OLEV12 and to a signal OLEV16 which is a decoding of the flip flops X06 and X03 for a clock operation, to develop the signal SSX042 which is inverted in an inverting gate 224. A NAND gate 226 functioning as an "and" gate responds to an interrupt signal NPT to a FEN signal indicating that the arithmetic unit has completed an operation, and to a signal OF01 indicating that the executive function is not being performed in that processor. A signal OGTX044 is applied from the gate 226 through an inverter gate 228 to a NAND gate 230 functioning as an "and" gate and also receiving signals LEV00, PHA0 and PCG to develop the signal OXTR. The signal PCG is developed by the arithmetic unit upon completion of an instruction and allows the program control unit to proceed with the next instruction. Decoding of an arithmetic operation to develop the signal PCG is well known in the art and will not be explained in further detail. The control input terminal of the flip flop X04 responds to the signal CCX04 developed by a NAND gate 234 functioning as an "or" gate and responsive to signals OXTR, OPHA3, OMCR and OSTA172. The flip flop X04 is set true for controlling an interrupt operation.

The informational input terminal of the flip flop X05 responds to signals OSSX051 and OSSC053 and the control terminal responds to a signal CCX05. A NAND gate 240 functioning as an "or" gate responds to a decoded signal OCDE17 from an external function instruction or a signal OCDS45 to apply a signal GTX052 to a NAND gate 242 functioning as an "and" gate which also receives the signal LEV00 to develop the signal OSSX051. The signal OCD545 is developed by a NAND gate 241 functioning as an "and" gate in response to signals CDE19, OCD97 and C2. The control input signal CCX05 is developed by a NAND gate 244 functioning as an "or" gate and responsive to signals OPHA3, OLEV04, OMCR and OSTA172. A NAND gate 251 functioning as an "and" gate responds to signals OX01, X02, X03, X04, X05 and X06 to develop the state signal OSTA172. The signal OSSX053 is developed by a NAND gate 243 functioning as an "and" gate and responsive to the inverted form of a signal ECC which is a request for an external function (FIG. 11) from an inverting gate 245 and a signal XTC from a NAND gate 247 and an inverter gate 249. The gate 247 responds to signals CDE17 and LEV04 indicating an external function operation and to the signal F07 indicating that the processor has executive control as required for a processor to control an external function operation.

The level flip flop X06 representing the most significant bit position of the level counter receives signals OSSX061 and OSSX062 at its informational input terminals and a signal CCX06 at its control input terminal. A NAND gate 246 functioning as an "or" gate responds to signals OLEV12, OLEV13, OLEV14 or OLEV16 to apply a signal SSX061 through an inverter gate 248 to the informational input terminal of the flp flop X06. A NAND gate 250 functioning as an "and" gate responds to signals LEV00, GTX061, PHA0 and PCG to develop the signal OSSX062. The signal GTX061 is developed by an inverter gate 252 from the signal OGTX044 as provided by the gate 226. The signal applied to the control input terminal of the flip flop X06 is developed by a NAND gate 256 functioning as an "or" gate and responsive to signals OSSX062, OPHA3, OMCR and OSTA172.

Figure 23:
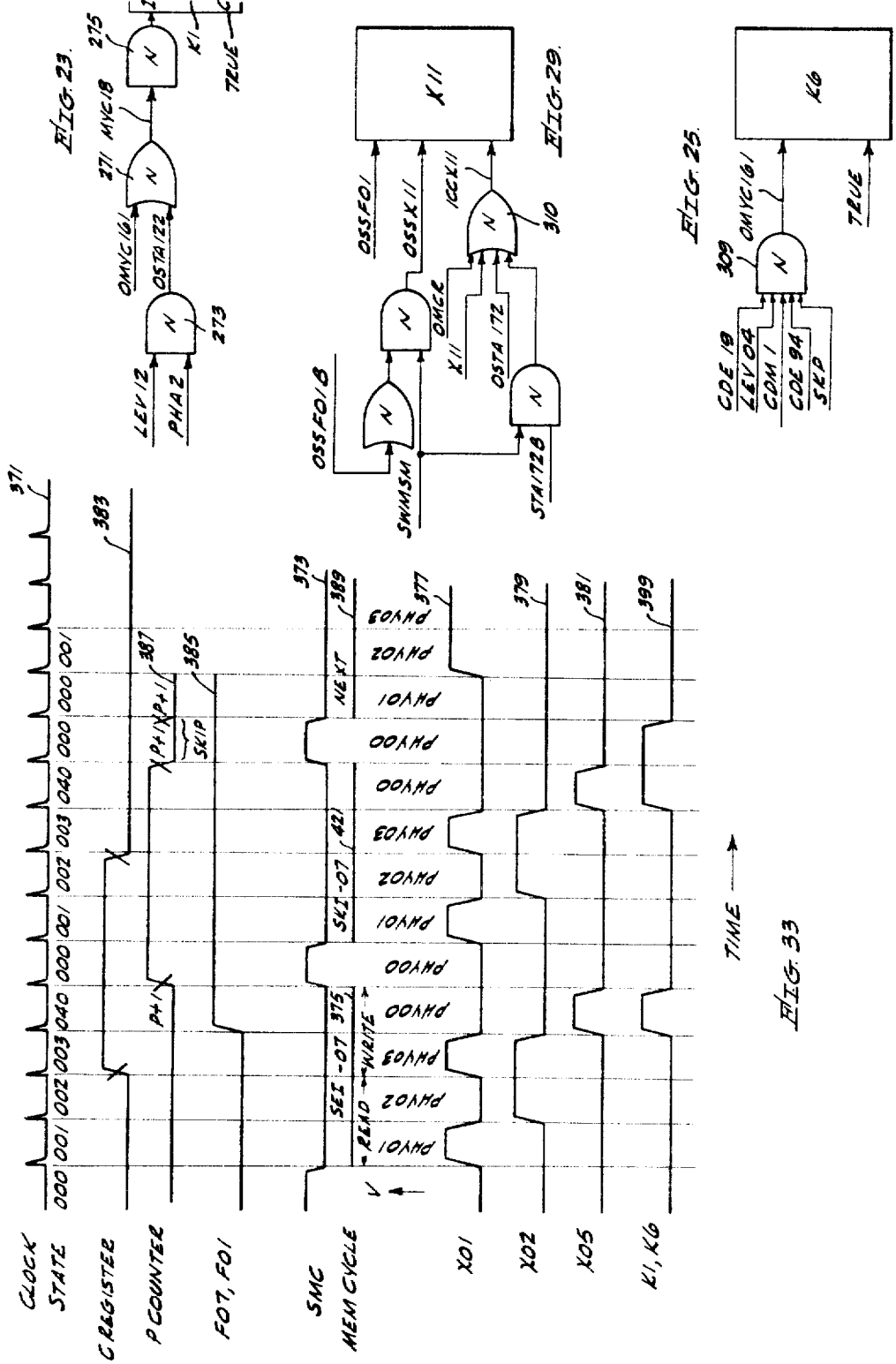
FIG. 23 is a schematic circuit and block diagram of the control logic for transferring plus "one" into the adder in each processor of FIG. 1.

Referring now to FIG. 23, a circuit for setting the K1 flip flop to apply plus one into the adder 52 (FIG. 1) includes a NAND gate 271 functioning as an "or" gate in response to signals OMYC161 (FIG. 25) and OSTA122, the latter signal being developed by an "and" gate 273 functioning as an "and" gate in response to signals LEV12 and PHA2. An inverter gate 275 is coupled between the gate 271 and the informational input terminal of the flip flop K1. The operation of a parallel adder to insert a plus one into the least significant stage for incrementing an address is well known in the art.

Figure 24:
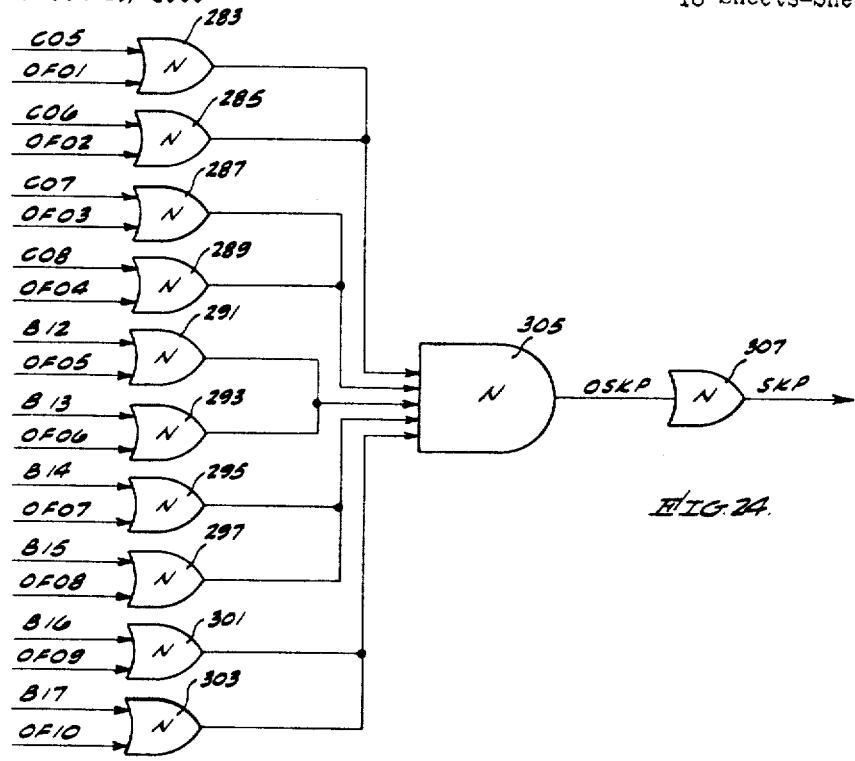
FIG. 24 is a schematic circuit diagram of the skip on indicator switches utilized in each of the processors of FIG. 1 to pass into an executive routine when executive control is obtained.

Referring now to FIG. 24, the gating structure is shown for performing a skip on indicator instruction SKI that is utilized in each processor to determine if executive control has been attained. As will be explained in further detail subsequently, portions of the skip on indicator instruction word are transferred to the C and B registers with a "one" in positions corresponding to indicators that are to be tested. If all indicator flip flops specified by a "one" are set, irregardless of the state of the unspecified indicators, the processor skips one instruction which can then transfer the program to an executive routine and executive control is attained. NAND gates 283, 285, 287, 289, 291, 293, 295, 297, 301 and 303, all functioning as "or" gates, are respectively responsive to signals C05 and OF01, C06 and OF02, C07 and OF03, C08 and OF04, B12 and OF05, B13 and OF06, B14 and OF07, B15 and OF08, B16 and OF10, and B17 and OF10 to apply signals to a NAND gate 305 functioning as an "and" gate to develop a signal OSKP. An inverting gate 307 develops a signal SKP which is utilized to pass the processor operation into an executive routine.

Referring now to FIG. 25, the flip flop K6 which controls the transfer of the contents of the program counter into the adder such as during normal incrementation of the address of the next instruction or during a skip on indicator instruction, will be explained. A NAND gate 309 functioning as an "and" gate responds to the signals CDE19, LEV04, CDE94, SKP and a code modifier signal CDM1. The signals CDE19 and CDE94 developed respectively from octally decoding the two most significant bits and the three least significant bits of the 5-bit instruction code in the C register, together form the code 14 utilized for operating on indicators by a conventional type of decoding circuit (not shown) as well known in the art. The numeral 9 in the code terms such as CDE19 and CDE94 is utilized to indicate the most significant and the least significant group of bits. The signal CDM1 is the code modifier for a skip on indicator (SKI) instruction. The flip flop K6 responds at its informational input terminal to the signal OMYC161 and to a true signal at its control terminal to be set and to be reset after a one clock period delay.

Referring now to FIG. 26, a typical interrupt flip flop $N_i$ of the interrupt register 68 (FIG. 1) of either processor P1 or P2 will be explained. The informational input terminal of the flip flop $N_i$ responds to an interrupt signal indicated as SET which may originate from the input-output unit 70 or be a clock interrupt signal as well known in the art. The flip flop $N_i$ is reset at its control terminal by a NAND gate 286 functioning as an "or" gate in response to signals $N_i$, $ORSN_i$ and the master clear signal MCR. The signal $ORSN_i$ is developed by a NAND gate 288 functioning as an "and" gate and responding to an interrupt priority signal $NPR_i$ and a signal RSN. A NAND gate 290 functioning as an "or" gate responds to the signal OSTA172 indicating that a previous interrupt cycle has been completed or to a signal OGTX171 indicating that the other processor has the interrupt cycle. A NAND gate 292 functioning as an "and" gate responds to a signal STA172B from the other processor and to a signal SWMSM which is received from the multi-single mode computer switch in the other processor.

Figure 27:
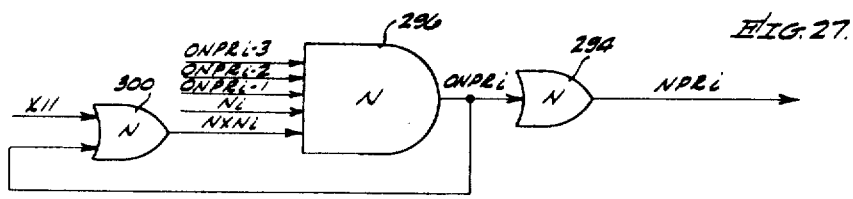
FIG. 27 is a schematic circuit diagram of a typical gating strcture used in each processor of FIG. 1 for developing priority interrupt signals.

Referring now to FIG. 27, a typical interrupt priority signal $NPR_i$ is provided through an inverter gate 294 and from a NAND gate 296 functioning as an "and" gate and responding to higher priority interrupt signals such as $ONPR_i$, $ONPR_{i-2}$ and $ONPR_{i-3}$, for example, to a signal $NXN_i$ and to a signal $N_i$ indicating that an interrupt flip flop $N_i$ is set. The signals such as $ONPR_{i-1}$ are from other gating arrangements similar to that of FIG. 27 except developing higher priority requests. The signal $NXN_i$ is developed by a NAND gate 300 functioning as an "or" gate and responsive to a signal X11 from an interrupt control flip flop and to a locking signal $ONPR_i$. The signal X11 maintains a false signal $NXN_i$ so that an interrupt routine is completed regardless of changes of other interrupt priority signals such as $ONPR_{i-1}$ and $ONPR_{i-2}$. It is to be noted that a gating arrangement similar to that of FIG. 27 except with a different priority is utilized for each interrupt flip flop $N_i$.

Figure 28:
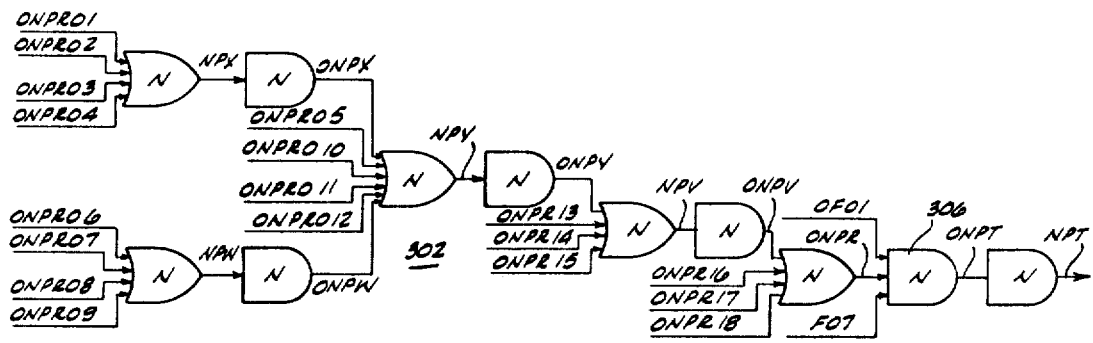
FIG. 28 is a schematic circuit diagram of a typical gating structure for developing an interrupt priority signal to be utilized in the circuit of FIG. 27 in the processor having executive control.

The interrupt control arangement of FIG. 28 includes and "or" gate network 302 which responds to one of the signals $ONPR_i$ to apply a signal ONPR to a NAND gate 306 functioning as an "and" gate. The signal ONPR goes to a true state when any of the input signals go to a false state into the preceding gate, that is, when any of 18 interrupt requests goes true. A signal OF01 indicating the absence of an executive function or interrupt lock out and the signal F07 indicating that the processor has executive control are also applied to the gate 306 which develops a signal ONPT at a false level when all of the input signals go to true levels indicating that an interrupt is pending in that processor. An inverter gate develops the signal NPT which is applied to the gate 126 (FIG. 22) for controlling an interrupt routine as well as being applied to the flip flop F01 (FIG. 19). A processor responds to an interrupt request when it has executive control and is not performing an executive function or an interrupt function.

Figure 34:
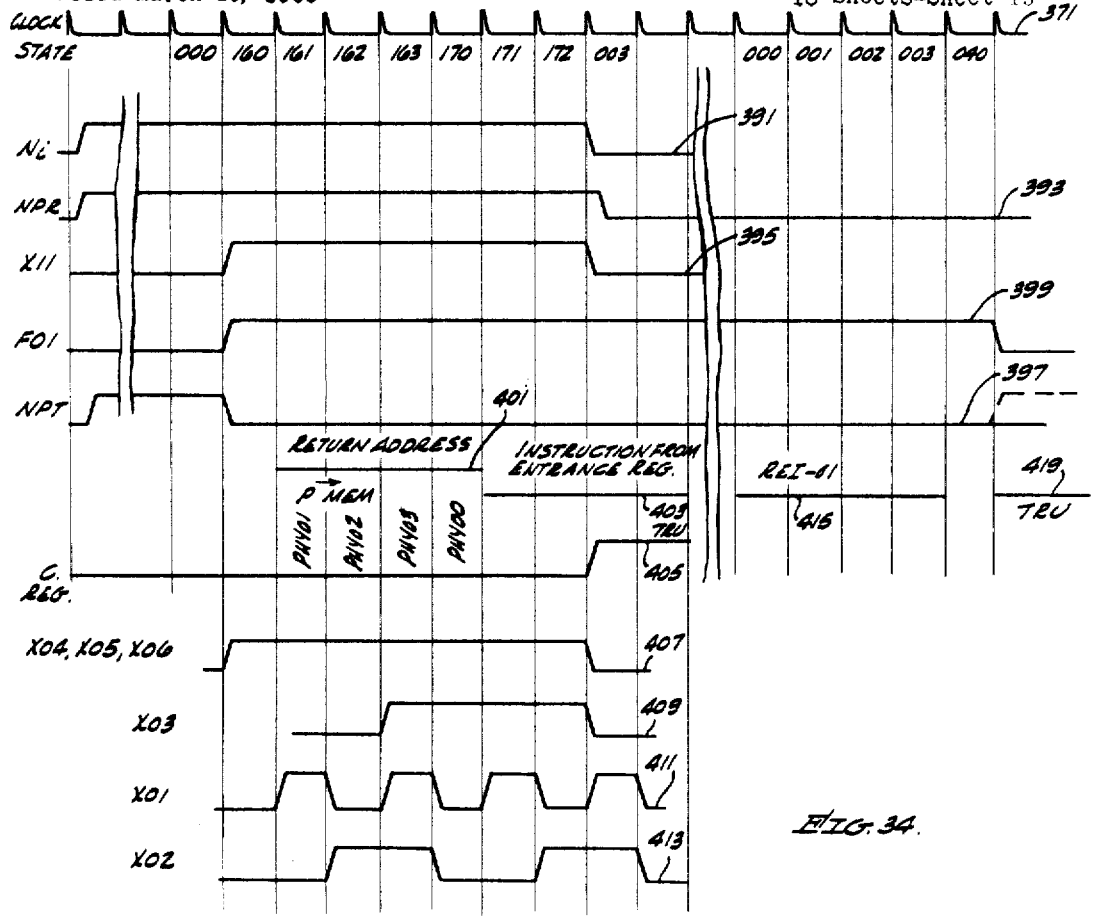
FIG. 34 is a schematic diagram of waveforms showing voltage as a function of time for explaining the operation of the interrupt routine utilized in the processors of FIG. 1 in accordance with the principles of the invention.

Referring now to FIG. 29, the control flip flop X11 responds at its informational input terminals to a signal OSSF01 from that processor and to a signal OSSX01 which is derived from signals of the other processor anded with the multi-single configuration switch at a gate 311. As explained relative to FIG. 19, the signal OSSF01 indicates an interrupt request to set the flip flop F01, that flip flop functioning as an interrupt lock out flip flop in response to interrupt requests. The control terminal of the flip flop X11 is coupled to a NAND gate 310 functioning as an "or" gate in response to signals OMCR, X11 and OSTA172 and to a signal OMRNB developed by a NAND gate functioning as an "and" gate in response to signals SWMSM and STA172B. As shown in FIG. 34, the flip flop X11 is set with the flip flop F01 and is only reset at state 172.

Figure 30:
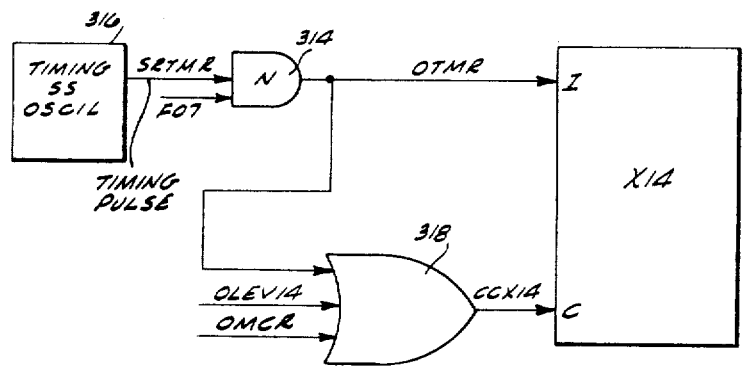
FIG. 30 is a schematic circuit and block diagram of the clock update control circuit utilized in each of the processors of FIG. 1.

Referring now to FIG. 30, the clock update cycle flip flop X14 responds to a clock update request only when that processor has executive control, that is, flip flop F07 is set in the true state. A signal OTMR is developed by a NAND gate 314 functioning as an "and" gate in response to a timing signal SRTMR which may occur every 1 millisecond, for example, from a single shot oscillator 316 and to a signal F07 which is at a true level when that processor has executive control. The control terminal of the flip flop X14 is coupled to a NAND gate 318 functioning as an "or" gate and responsive to the signal OTMR for setting the flip flop, to a signal OLEV14 which is true when the clock update cycle is complete and to a master clear signal OMCR. The flip flop X14 controls development of an LEV17 signal by gating circuits (not shown) but which are of the type utilized to develop the other level signals. Thus the real time clock update routine is also controlled only by the processor having executive control. A clock update routine to remove a clock word from a fixed location in memory, increment the contents and replace the word in memory is well known in the art and will not be explained in further detail. In a multiprocessor system having a real time clock, the updating of the clock word by only the processor having executive control is a desired function of the executive.

Figure 31:
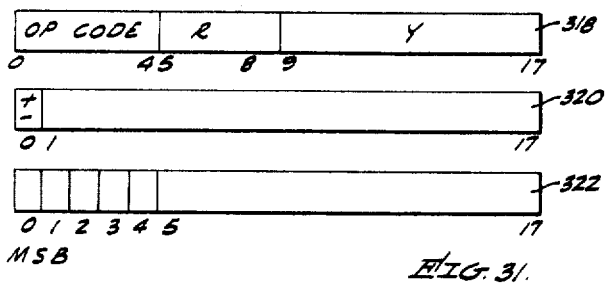
FIG. 31 is a schematic diagram showing the format of the words that may be utilized in the system of FIG. 1.

Referring now to FIG. 31 as well as to FIG. 1, the arrangement of the instruction word that may be utilized in the system in accordance with the principles of the invention and shown by a format 318 includes the most significant bits 0 through 4 forming the operating code which is transferred to the command register 62, bits 5 through 8 which form the R field address to select an index register in memory and the bits 9 through 17 which form the address Y of the operand to be addressed in response to the instruction. As well known in the art, each operating code defines a particular instruction with the code being maintained in the C register 62 while that instruction is performed and until the next instruction word is accessed from memory to transfer a new instruction code to the C register 62. For example, the code 17 controls an external function operation in which the arithmetic unit controls the memory to send the contents of the memory word specified by the instruction word address, to the input-output unit. The operand address which includes 17 bits may be developed, for example, by adding the Y field to the contents of an index register defined by the R field and assembling the address in the B register. It is to be noted that the principles of the invention are applicable to systems developing the operand address by other arrangements such as by utilizing the 9 bits or more in the address portion of the operand accessed from memory without modification thereof. A word format 320 shows the arrangement of an operand that may be stored in memory and accessed in response to the address provided by either the arithmetic unit or by the input-output unit. For example, the operand may utilize the most significant bit as the sign bit and the 17 least significant bits as the magnitude of a stored number. An address of a word supplied to the address register 26 from either the program control unit or from the input-output unit as shown by a format 322 includes bits 5 through 17 or 13 bits. The bits 1 to 4 may be utilized as bank selectors when a plurality of memory banks are utilized in the system, for example, or to select specific portions of a single large memory array.

Figure 32:
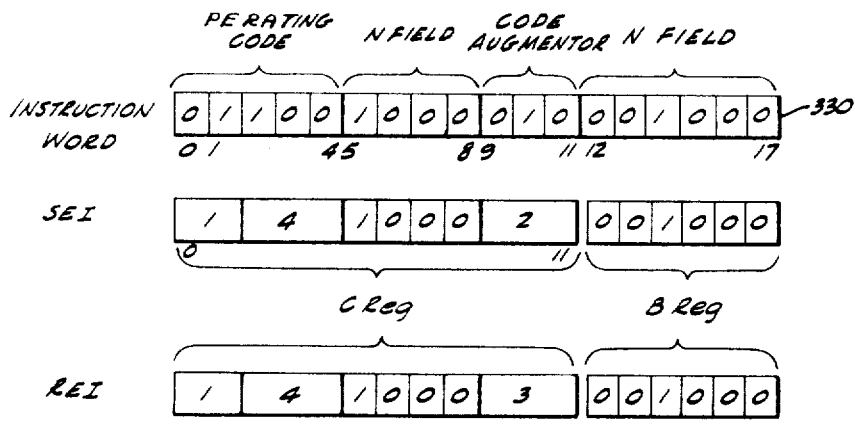
FIG. 32 is a schematic diagram showing the transfer of data during set indicator and reset indicator instructions in each of the processors of FIG. 1.

Referring now principally to FIG. 32 as well as to FIGS. 1, 19 and 20, the operation of one of the processors to gain executive control will be explained in further detail. The executive control flip flop F07 is set at the completion of a job routine in order to gain executive control by a set indicator instruction SEI which is a code 14 instruction with an augmenter of 2. Also, the flip flop F07 may be reset by a reset instruction REI which is also a code 14 instruction with an augmenter of 3. As shown in FIG. 32, an instruction of a format 330 for operating on indicators has two parts of the N field which includes a "one" at positions corresponding to the indicators that are to be set or reset as respectively determined by the augmenters 2 and 3 of the code 14 instruction. The first 12 bits of the instruction are transferred to the command register 62 and the last 6 bits of the instruction are transferred to the B register 50. A skip on indicator instruction SKI which is a code 14 instruction with an augmenter of 1 is similar to that shown in FIG. 32 except that if all indicators specified by 1 bits in the N fields are true, one instruction is skipped. If any of the specified indicators are off or in the false state, the next instruction in sequence is derived from memory and performed. Another typical instruction is for an unconditional transfer TRU in which the computer takes the next instruction from the location in memory specified by the address Y and Yi (FIG. 31). The operation of a computer to perform control instruction or arithmetic instructions is well known in the art and will only be explained relative to the specific operation of the floating executive system of the invention. The following tables further illustrate the operation of the above mentioned and other typical control instructions:

| MNEMONIC | CODE | STATE | X06 | X05 | X04 | X03 | X02 | X01 | NPT | PCG | SKP | K6 | K1 | | NEXT STATE |
|---|---|---|---|---|---|---|---|---|---|---|---|---|---|---|---|
| SEI | 14-2 | 000 | 0 | 0 | 0 | 0 | 0 | 0 | 1 | | 0 | | | P→Y, SMC | 001 |
| REI | 14-3 | 001 | 0 | 0 | 0 | 0 | 0 | 1 | | | | | | | 002 |
| | | 002 | 0 | 0 | 0 | 0 | 1 | 0 | | | | | | P→ $\Sigma$ | |
| | | 002 | 0 | 0 | 0 | 0 | 1 | 0 | | | | | | D→B + C, $B_m$→$\Sigma$ | 003 |
| | | 003 | 0 | 0 | 0 | 0 | 1 | 1 | | | | | | Set or Reset $F_i$ | 040 |
| | | 003 | 0 | 0 | 0 | 0 | 1 | 1 | | | | | | P + 1→ $\Sigma$ | |
| | | XXX | | | | | | | | | | 1 | 1 | $\Sigma$ → P | |
| | | 040 | 0 | 1 | 0 | 0 | 0 | 0 | | | | | | | 000 |
| SKI | 14-1 | 000 | 0 | 0 | 0 | 0 | 0 | 0 | 1 | | 0 | | | P→Y, SMC | 001 |
| | | 001 | 0 | 0 | 0 | 0 | 0 | 1 | | | | | | | 002 |
| | | 002 | 0 | 0 | 0 | 0 | 1 | 0 | | | | | | P→ $\Sigma$ | |
| | | 002 | 0 | 0 | 0 | 0 | 1 | 0 | | | | | | D→B + C, $B_m$→$\Sigma$ | 003 |
| | | 003 | 0 | 0 | 0 | 0 | 1 | 1 | | | | | | P + 1→$\Sigma$ | |
| | | 003 | 0 | 0 | 0 | 0 | 1 | 1 | | | | | | | 040 |
| | | 040 | 0 | 1 | 0 | 0 | 0 | 0 | | 0 | | | | | 000 |
| | | 040 | 0 | 1 | 0 | 0 | 0 | 0 | | 1 | | | | P + 1→$\Sigma$ | 000 |
| | | XXX | | | | | | | | | | 1 | 1 | $\Sigma$ → P | |

| MNEMONIC | CODE | STATE | X06 | X05 | X04 | X03 | X02 | X01 | PCG | MICRO INSTRUCTION | NEXT STATE |
|---|---|---|---|---|---|---|---|---|---|---|---|
| TRU | 00 | 000 | 0 | 0 | 0 | 0 | 0 | 0 | 1 | P→Y, SMC | 001 |
|  |  | 001 | 0 | 0 | 0 | 0 | 0 | 1 |  |  | 002 |
|  |  | 002 | 0 | 0 | 0 | 0 | 1 | 0 |  | P→Σ |  |
|  |  | 002 | 0 | 0 | 0 | 0 | 1 | 0 |  | $B_m$→Σ   D→B + C | 003 |
|  |  | 003 | 0 | 0 | 0 | 0 | 1 | 1 |  | Σ→B |  |
|  |  | 003 | 0 | 0 | 0 | 0 | 1 | 1 |  | Σ→P | 000 |

| MNEMONIC | CODE | STATE | X06 | X05 | X04 | X03 | X02 | X01 | NPT | PCG | K6 | F07 | ECC | MICRO INSTRUCTION | NEXT STATE |
|---|---|---|---|---|---|---|---|---|---|---|---|---|---|---|---|
| EXF | 17 | 000 | 0 | 0 | 0 | 0 | 0 | 0 | 0 | 1 | 0 |  |  | P→Y, SMC | 001 |
|  |  | 001 | 0 | 0 | 0 | 0 | 0 | 1 |  |  |  |  |  |  | 002 |
|  |  | 002 | 0 | 0 | 0 | 0 | 1 | 0 |  |  | 16 |  |  | P→Σ |  |
|  |  | 002 | 0 | 0 | 0 | 0 | 1 | 0 |  |  |  |  |  | D→B + C, $B_m$→Σ | 003 |
|  |  | 003 | 0 | 0 | 0 | 0 | 1 | 1 |  |  | 16 | 18 |  | P + 1→Σ |  |
|  |  | 003 | 0 | 0 | 0 | 0 | 1 | 1 |  |  |  |  |  | Σ→B |  |
|  |  | 003 | 0 | 0 | 0 | 0 | 1 | 1 |  |  |  |  |  |  | 040 |
|  |  | 040 | 0 | 1 | 0 | 0 | 0 | 0 |  |  | 1 | 1 |  | B→Y, SMC | 000 |
|  |  |  |  |  |  |  |  |  |  |  |  |  |  | Also Alert I.O., Set E104 |  |
|  |  | 040 |  |  |  |  |  |  |  |  | 0 |  |  |  | 000 |
|  |  | 040 |  |  |  |  |  |  |  |  | 1 | 0 |  | B→Y, SMC | 040 |

| MNEMONIC | STATE | X06 | X05 | X04 | X03 | X02 | X01 | X14 | NPT | FEN | K6 | F01 | F07 | MICRO INSTRUCTION | NEXT STATE |
|---|---|---|---|---|---|---|---|---|---|---|---|---|---|---|---|
|  | 000 | 0 | 0 | 0 | 0 | 0 | 0 | 0 | 1 | 1 |  | 0 | 1 | 16 P→Σ | 160 |
| INTERRUPT | 160 | 1 | 1 | 1 | 0 | 0 | 0 |  | 1 |  |  |  |  | $N_R$→Y SMC/ω Σ→B | 161 |
| CYCLE | 161 | 1 | 1 | 1 | 0 | 0 | 1 |  |  |  |  |  |  |  | 162 |
|  | 162 | 1 | 1 | 1 | 0 | 1 | 0 |  |  |  |  |  |  | B→D | 163 |
|  | 163 | 1 | 1 | 1 | 0 | 1 | 1 |  |  |  |  |  |  |  | 170 |
|  | 170 | 1 | 1 | 1 | 1 | 0 | 1 |  |  |  |  |  |  | $N_{+1}$→Y, SMC | 171 |
|  | 171 | 1 | 1 | 1 | 1 | 0 | 1 |  |  |  |  |  |  |  | 172 |
|  | 172 | 1 | 1 | 1 | 1 | 1 | 0 |  |  |  |  |  |  | D→B and C | 003 |

In the above tables, the code is developed as a result of decoding the contents of the command register 62 and the state results from decoding the contents of the flip flops X06 to X01. The flip flop X06 is decoded as a signal LEV09 or LEV19, the flip flops X05 to X03 are decoded as signals LEV91 to LEV97 and the flip flops X01 and X02 are decoded as signals PHA00 to PHA03, these signals being combined into a state or an STA signal. Micro instructions or signals are developed by conventional decoding networks (not shown) to control the individual operations at each state. In the SEI and REI instructions the contents of the program counter 60 are transferred to the address register indicated as Y and a start memory cycle signal SMC is applied to the memory during state 000. During state 001 the memory read cycle is performed and during state 002 the contents of the program counter are transferred to the adder indicated as Σ and the contents of the data register are transferred to the B and C registers. During state 003, the indicator flip flop is set or reset and the contents of the program counter are transferred to the adder to be incremented by "one" under control of flip flop K1 and K6 and decoded micro instructions 16 and 18. By responding to the instruction code in the C register and to the state of the PCU sequencer, the micro instruction signals are developed in a manner well known in the art. At the next state, the contents of the adder are transferred to the program counter. At state 040, the instruction is completed and the program control unit sequencer is returned to state 000.

During a skip on indicator instruction SKI, the operation is similar to the SEI and REI instruction except the program counter is incremented during both states 003 and 040 under control of micro instructions 16 and 18.

The unconditional transfer instruction TRU (code 00) starts at state 000 to transfer the contents of the program counter to the address register Y and to develop a start memory cycle SMC. At state 003, depending upon control signals (not shown), the contents of the program counter are transferred to the B and C registers and the modifier in the B register is transferred to the adder. Then the contents of the adder are transferred to both the B register or to the program counter and the instruction is completed.

The external function instruction EXF or code 17 after deriving the instruction word from memory, transfers the contents of the program counter to the adder and the data register to the B and C registers during state 002. The contents of the program counter are incremented by "one" during state 003 under control of K6 and micro instructions 16 and 18, and the contents of the adder are transferred to the B register. During state 040, the flip flop E104 is set and the input-output unit is alerted that data is to be transferred thereto from memory. Also during state 040, the contents of the B register are transferred to the memory address and an SMC signal (FIG. 17) is developed to transfer a word of data to the input-output unit under control of the processor having executive control, that is, in which F07 is true.

During an interrupt cycle which is not a coded instruction in the illustrated system, states 160, 161, 162 and 163 are developed to apply the address of the interrupt return address register to the address register Y, to start the memory cycle, transfer the contents of the adder to the B register and to transfer the address in the B register into the data register for being stored at the return address $N_R$ of the memory. At states 170, 171 and 172, the interrupt entrance register address $N_{+1}$ is developed by a network (not shown) and is transferred to the address register. The contents of the data register which may be a TRU instruction stored at the interrupt entrance memory address $N_{+1}$, are transferred to the B and C registers to control entering of the interrupt program associated with the interrupt request.

Referring now to the waveforms of FIG. 33, the operation of an SEI–07 and an SKI–07 instruction will be explained in further detail. The clock signal of a waveform 371 is applied to all processors of the system and may operate at any desired rate in accordance with the principles of the invention, such as developing a pulse every 0.45 microsecond. At state 000 as determined by flip flops X06 to X01, the contents of the program counter are transferred to the memory address register and a start memory cycle SMC signal of a waveform 373 starts the memory phase counter through the four phase (PHY01, PHY02, PHY03 and PHY00) read-write memory cycle indicated by a line 375. The states of the flip flops X01, X02 and X05 of respective waveforms 377, 379 and 381 are shown to indicate the state counts during the SEI instruction and the SKI instruction. At the start of the state 003, the instruction bits of the instruction word are transferred from the data register to the command or C register as indicated by a waveform 383. At state 040, the flip flop F07 is set for SEI and reset for REI, as shown by a waveform 385. It is to be noted that the operation for setting and resetting flip flop F01 is similar to that described relative to flip flop F07. At the end of state 040, the contents of the program counter are incremented by "one" in the adder as indicated by a waveform 387. The flip flops K1 and K6 control the incrementing of the contents of the program counter in the adder as indicated by a waveform 399. The processor then goes into state 000 which is the start of an instruction such as SKI and the contents of the program counter are transferred to the memory address register and a start memory cycle signal SMC of a waveform 373 is applied to the memory control circuits. The memory cycle to derive the SKI instruction from memory is indicated by a line 421. At state 003, the contents of the data register are transferred to the B register and to the C register as indicated by the waveform 383. At the end of the state 040 the contents of program counter are incremented by one in the adder. During the following state 000, the processor skips an instruction and at the state 000 during a second clock period, the normal incrementation of the contents of the program counter is performed as indicated by the waveform 387. The next instruction to be derived from memory which may be an instruction of the executive routine, is indicated by a memory cycle line 389.

Referring now to FIG. 34, the operation of an interrupt cycle relative to the clock pulses of the waveform 371 will be explained in further detail. When any interrupt flip flop $N_1$ is set true as indicated by a waveform 391 in response to an interrupt signal from a source such as the input-output unit, the signal NPR (FIG. 16) also becomes true as shown by a waveform 393. Also as shown by a waveform 397, the signal NPT (FIG. 28) goes true in the processor which has executive control if it is not performing an executive function. When the current instruction is completed by the processor, the flip flop X11 is set true as indicated by a waveform 395 and the flip flop F01 is set true substantially at the same time, as indicated by a waveform 399. The flip flop F01 performs both the functions of an executive function flip flop and as an interrupt lock out flip flop to prevent other interrupts from being processed because the interrupt lock out is treated as an executive function during an interrupt routine. The flip flop F01 when set to the true state prevents other interrupts from halting the interrupt program operation. The signal NPT falls at the start of state 160 as shown by the waveform 397 when flip flop F01 is set to the true state and the flip flop X11 is also set to the true state as shown by the waveform 395.

The contents of the program counter are then stored in the return address register through states 161, 162 and 163 and 170 indicated by a line 401. During states 171, 172 and 003, the instruction stored in the entrance register is derived from memory as indicated by a memory line 403 and the interrupt routine is started. At the end of state 172, the instruction stored in the entrance register or memory location is transferred to the command register as indicated by a waveform 405 which may be an unconditional transfer TRU to the interrupt routine.

Waveforms 407, 409, 411 and 413 are shown to respectively indicate the states of flip flops X04, X05 and X06, X03, X01 and X02 during the above described interrupt operation. The interrupt flip flop $N_i$ and the flip flop X11 are reset at the end of state 172 and the signal NPR goes false at the state 003.

At completion of performance of the interrupt program, the indicator flip flop F01 is reset by an REI instruction and during states 000, 001, 002 and 003 the reset indicator instruction is derived from memory during a memory cycle 415. At the end of state 040, the flip flop F01 is reset as indicated by the waveform 399 and if another interrupt is pending, the interrupt routine is repeated as indicated by the dotted portion of the waveform 397. If another interrupt is not pending, a transfer instruction back to the main program may be derived from memory as indicated by a memory cycle 419.

Figure 35:
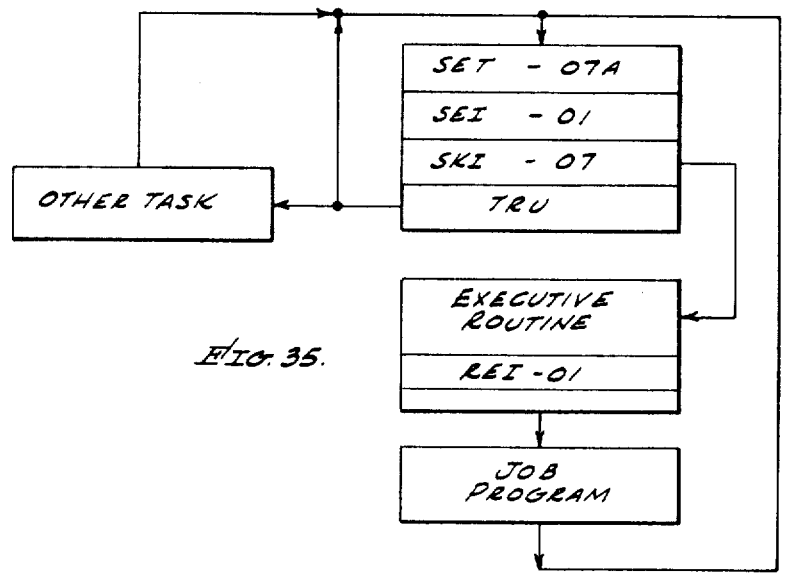
FIG. 35 is a schematic flow diagram of the operation of the processors of FIG. 1 to obtain executive control in accordance with the principles of the invention.

Referring now to FIG. 35, an operation of either processor to obtain the executive control is to first set indicator F07 in that processor with an SEI instruction having a "one" in the fourteenth bit position as shown in FIG. 32. At the same time the indicator F07 is reset in the other processor. The indicator F01 is then set by an SEI instruction having a "one" in the fifth bit position. The next instruction which samples indicator F07 is a skip instruction SKI which skips the next instruction if F07 is true by transferring the operation directly to the executive routine. The next instruction after the skip instruction is an unconditional transfer TRU which transfers to another task, for example, if executive control is not obtained. The operation may proceed from the completion of another task to the start of the routine. When executive control is obtained and a skip results, the executive routine may be performed and may be any of a plurality of operations such as to set an indicator, update the clock, mark the program taken in a table in memory or any desired operation. The job program or task is then performed preceded by an instruction REI to reset the indicator F01 so that other requesting processors may obtain an executive control. The operation to obtain executive control is then repeated.

Figure 36:
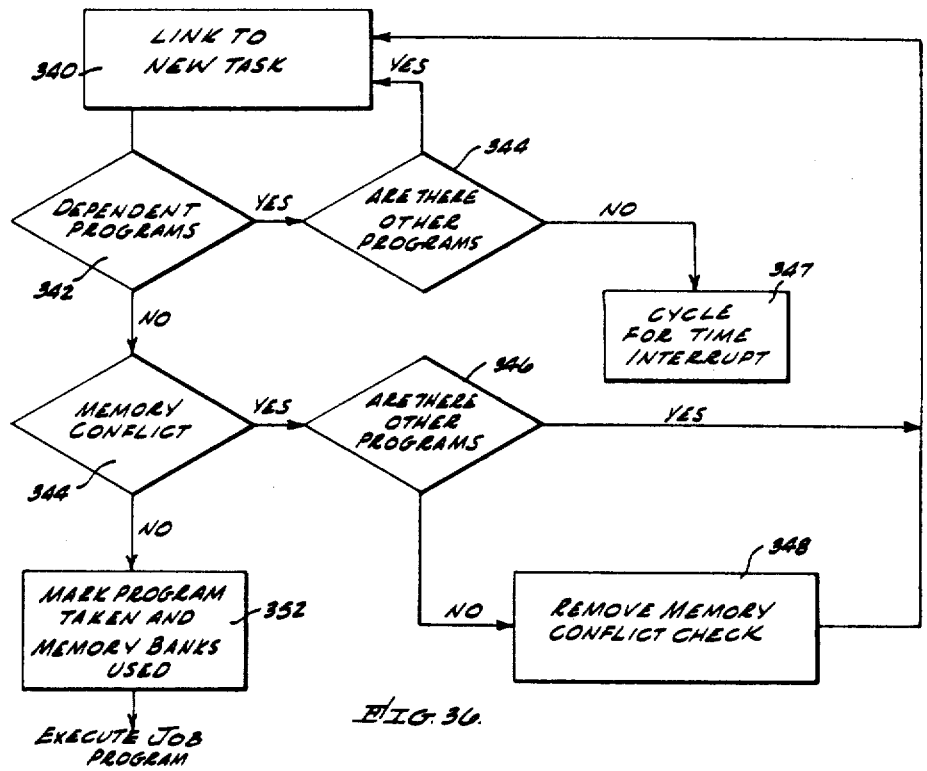
FIG. 36 is a schematic flow diagram showing a typical executive routine that may be performed by a processor obtaining executive control.

Referring now to FIG. 36, one example of an executive routine that may be performed after obtaining executive control is shown in the form of a flow diagram. During processor operation in a block 340, the processor is linked to a new task such as searching a job list or table in memory. At a block 342, a comparison is performed to determine if a dependent program has been selected and if so, a determination in a block 344 is performed as to whether other nondependent programs may be obtained. If no independent programs are available, the processor may cycle as indicated by a block 347. If the program is not dependent in block 342, the operation proceeds to a block 344 to determine if a memory conflict is present such as by checking a table of memory conflicts stored in memory. If a memory conflict is present, the operation determines in a block 346 whether other programs are available from which the processor may either obtain a new task or remove the memory conflict check in a routine of a block 348. If no memory conflict is present as determined by the routine in the block 344, the operation proceeds to a block 352 which marks the program taken and the memory sections or banks that are to be utilized. The processor then executes the job program as shown in FIG. 35. It is to be understood that the routine in FIG. 36 is only one example of an executive routine that may be utilized in the system in accordance with the invention and any desired routine may be utilized within the scope of this invention. For example, an executive routine may only reset the clock count stored in memory.

Referring now to the state table of FIG. 37 as well as to FIGS. 19 and 20, all of the combinations of the executive control and executive function flip flops of the processors P1 and P2 are shown as combinations 1 to 16. During combinations 1, 2, 5 to 8, 10 and 14, an initialization operation is being performed such as master clear or start up. During the initialization states neither processor has executive control. At the state of combination 3, the processor P2 has executive control with the flip flop F07 in processor P2 being set to the true state as a result of a request at the gate 192 (FIG. 5) by a set instruction when the other processor P1 is not performing an executive function so that KXFB is true, as a result of the flip flop F07 being set by the signal ORSF07B developed by the flip flop F07 in the other processor P1 being reset, or as a result of a single mode switch operation. At the state of combination 4, the processor P2 has both executive control and the executive function, that is, flip flops F07 and F01 are in the true state in processor P2. The flip flop F01 may be set in response to a set instruction at the gate 180 when F07 is true or in response to an interrupt request at the gate 182 when flip flop F01 is in the false state in processor P2. At the state of the combination 9, the processor P1 has executive control as the flip flop F07 is set to the true state, and at the state of the combination 13, the processor P1 has both executive control and executive function. The states of combinations 11, 12, 15 and 16 represent conditions for single mode operation as determined by the switch SWMSM.

Referring now to FIG. 38, a schematic diagram is shown of a floating executive system utilizing three processors P1, P2 and P3 in accordance with the principles of the invention. The three processors respond to request control sources 346, 348 and 350 which may provide the decoded set instructions or SEI for flip flop F07 in each of the three processors. Each processor includes an executive control flip flop F07 or indicator flip flop EC and an executive function flip flop F01 or indicator flip flop EF. Each processor P1, P2 and P3 respectively includes a NAND gate 352, 354 and 356 functioning as an "and" gate and coupled to the respective request control sources 346, 348 and 350 for setting the corresponding executive control flip flop in response to a set instruction. NAND gates 358, 360 and 362 functioning as "and" gates have input terminals coupled to the executive control and executive function flip flops of the respective processors P1, P2 and P3 for developing a signal on respective leads 364, 366 and 368 when the EC and EF flip flops are in the respective true and false states. The leads 364, 366 and 368 are coupled to respective interrupt control units 370, 372 and 374 for allowing interrupt conditions to set the EF flip flop of only the processor having executive control and not the executive function. Input-output control units 380, 382 and 384 are controlled by the executive control flip flop of corresponding processors so that input-output operations are controlled by only the processor having executive control. For resetting each executive control flip flop when one of the other processors has executive control, NAND gates 388, 390 and 392 functioning as "or" gates are coupled to reset the EC flip flops of the respective processors P1, P2 and P3. Each NAND gate 388, 390 and 392 is coupled to the output leads of the other two of gates 352, 354 and 356 so that when one of the other processors obtains executive control, the EC flip flop of the other two processors is reset. All of the EC flip flops are also reset by the master clear signal MCR or by a reset instruction REI. Each of the gates 352, 354 and 356 is allowed to be energized only when a set of EC and EF flip flops are not both in a true state at one of the other two processors indicating that the executive function or program is not being performed by another processor. NAND gates 359, 361 and 363 functioning as "or" gates each respond to both the set signal from the interrupt controls and to a set instruction SEI for setting the corresponding EF flip flops. Each of the EF flip flops may be reset by an REI instruction as explained relative to FIG. 4. In the arrangement with three or more processors, any processor may force a predetermined other processor such as when the processor is reset, to assume executive control, or logical decision making circuitry (not shown) may be utilized to force a selected processor to assume executive control. In the illustrated arrangement, gates 388, 390 and 392 apply signals to the respective processors P3, P1 and P2 for forcing the EC flip flops thereon to be set when the EC flip flop of the first processor is reset. The system of the invention is not to be limited to any number of precessors as any combination of processors and input-output controllers may operate with the floating executive control in accordance with the principles of the invention.

Figure 39:
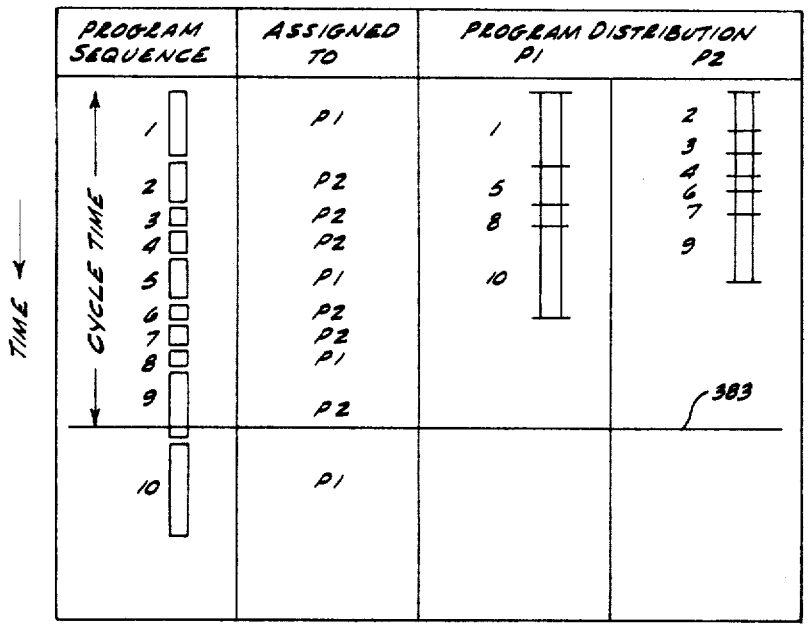
FIG. 39 is a schematic diagram of program processing time for further explaining the operation of the multiprocessor system of FIG. 1.

Referring now to FIG. 39, a schematic diagram shows the program distribution of routines or jobs in the multi-processor system in accordance with the invention. A program sequence column shows 10 work programs or tasks which are continually repetitive in a real time system, for example. The program sequence column shows the amount of time required for a single processor to perform all job routines. In the system of the invention, the jobs are obtained by the processors P1 and P2 as shown in the assigned column with the total time required by each processor P1 and P2 shown in the program distribution columns. Thus neither processor is required to wait for an assignment and a relatively long program sequence is performed in a relatively short time with the floating executive operation in accordance with the invention.

A line 383 shows the total time that may be allowed for each program sequence so that the sequence is automatically restarted as a result of time interrupt. By programming a cyclic time interrupt into the system and with the most important routines such as 1 to 8 to be handled in that time by one processor, the system is capable of automatic graceful degradation, that is, operation with decreased capacity but performing the most important functions. The principles of the invention also include arrangements for responding to a failure signal such as from the power supply to perform selected numbers of routines from a table in memory or to perform a different and shorter program. Also the system of the invention may be utilized with a reduced number of processors as a result of a failure or test condition by loading memory with a different and shorter program. The principles of the invention are not to be limited to only a plurality of processors as any plurality of data handling units may be utilized in accordance with the invention. Also, the invention includes other arrangements and organization of the processor's control elements and operating elements within the system such as the input-output unit, the sources of interrupt signals and the memory.

Thus there has been described a multiprocessor system in which flip flops or indicators are utilized to provide an exclusive "or" type operation with only one processor having executive control at any one time. Executive control may be transferred either by setting the executive control flip flop in a first processor when the other processor is not performing an executive function, or by being forced to assume executive control in the first processor when the second processor is reset such as in response to an instruction or a failure condition. An arrangement is provided at each executive control indicator to prevent executive control from being assumed by more than one processor so that it is maintained by the processor having executive control, in response to simultaneous requests for executive control. The executive function indicator performs the function of executive routine indication when a processor is performing an executive function to prevent other processors from gaining executive control. The system of the invention allows a plurality of processors to operate with an efficiency of time and equipment.

What is claimed is:

1. A system operable with a plurality of processors performing routines comprising
   first means for each processor having a selected state for controlling the corresponding processor for self assignment of routines,
   and second means, intercoupled between said plurality of first means, for controlling said first means so as to exclusively obtain said selected state for self assignment of routines for different ones of said processors during different time intervals.

2. A system having a plurality of processing elements for performing a plurality of program and executive routines comprising
   first means in each processing element for controlling the corresponding processor to perform executive routines,
   and second means, intercoupling said plurality of first means, for controlling said plurality of first means so that different ones of said processing elements exclusively perform executive routines during different time intervals.

3. A supervisory control system for a plurality of processors comprising
   indicator means for each processor, each having set and reset states,
   request means for each processor for setting the indicator means to provide supervisory control and for resetting the indicator means to terminate supervisory control,
   means coupled to the indicator means for each processor for responding to the indicator means being set in one processor to apply a reset signal to the indicator means of the other processors,
   and means coupled to the indicator means for each processor for responding to the indicator means being reset in one processor to apply a set signal to the indicator means in one of the other processors.

4. A control system for a plurality of processors comprising
   indicator means for each processor for controlling the corresponding processor to perform a predetermined operation,
   first means for each processor to control the indicator means to allow performing of said predetermined operation,
   second means for each processor to control the indicator means to prevent performing of said predetermined operation,
   third means for each processor to respond to the corresponding indicator means to perform said predetermined operation,
   and fourth means intercoupling the first and second means for said plurality of processors so that one and only one processor performs said predetermined operation at any one time.

5. A system having a plurality of processors, each capable of performing a control routine comprising
   a control indicator for each processor having a set and a reset state,
   means for each processor for setting the control indicator therein,
   means coupled between the control indicators of said plurality of processors for responding to the indicator being set in one processor to develop a signal for resetting the indicators in the other processor,
   means coupled between the control indicators of said plurality of processors for responding to the indicator being reset in one processor to set the indicator in a selected other processor,
   and means in each processor for transferring to the control routine when the corresponding control indicator is set.

6. In a computing system having first and second data handling units operating in response to a control program stored in a common memory comprising
   indicator means for each data handling unit, said indicator means each having first and second states for controlling access of the corresponding data unit to the control program,
   first means for each data handling unit for each selectably changing the corresponding indicator means to said first and second states, second means for each data handling unit coupled to said first means thereof to respond to the indicator means in the first state to control the corresponding data handling unit to perform said control program, and third means coupling the indicator means for said plurality of data handling units so that one or the other but not both of said indicator means is in said first state during system operation.

7. A system having a plurality of processors all capable of performing an executive routine comprising an executive control indicator in each processor, an executive function indicator in each processor, means in each processor for selectably setting said executive control indicator and said executive function indicator, means in each processor for selectably resetting said executive control indicator and said executive function indicator, means coupled to the executive control indicators and the executive function indicators of said plurality of processors to prevent the executive control indicator of a first processor from being set when the executive function indicator of another processor is set, means coupled to the executive control indicators of said plurality of processors to respond to the executive control indicator in a first processor being set to develop a signal for resetting the executive control indicator in all other processors, and means coupled to the executive control indicators of said plurality of processors to set the executive control indicator in one of said plurality of processors when the control indicator in another of said processors is reset.

8. An executive routine control system for a plurality of processors operating with a common memory system comprising first and second indicators in each processor for controlling the corresponding processor to respectively operate with executive control and to perform an executive routine, means in each processor for selectably setting the first and second indicators in each processor, means coupled between the first indicators of said plurality of processors for responding to the first indicator being set in one processor to reset the first indicator in another processor, means coupled between the first indicators of said plurality of processors for responding to the first indicator being reset in one processor to set the first indicator in another processor, and means coupled between the first and second indicators of each processor and to the first indicator of each of the other processors for inhibiting the first indicators from being set when the first and second indicators of one processor are set and for allowing the first indicators of the processors to be set when the second indicator is reset in the processor in which the first indicator is set.

9. An executive routine control system for a plurality of processors operating with a common memory system comprising first and second indicators for each processor for respectively controlling the corresponding processor to operate with executive control and to perform an executive routine, first means for each processor for selectably setting the first and second indicators of each processor, second means coupled between the first indicators, of said plurality of processors for responding to the first indicator of one processor being set to reset the first indicator of another processor, third means coupled between the first indicators of said plurality of processors for responding to the first indicator being reset of one processor to set the first indicator of another processor, fourth means for each processor coupled to said first means thereof for responding to a processor fault condition to reset the first indicator of the corresponding processor and set the first indicator of another processor, and fifth means coupled between the first and second indicators of each processor and to the first indicator of each of the other processors for inhibiting the first indicators from being set when the first and second indicators of one processor are set and for allowing the first indicators of the processors to be set when the second indicator is reset of the processor for which the first indicator is set.

10. A system for providing executive control to a first and a second processor comprising an executive control flip flop and an executive function flip flop for each of said first and second processors, a source of set, reset and skip instruction signals in each processor coupled to the executive control and executive function flip flops of the corresponding processors for setting and resetting the executive function flip flops and for developing a skip signal when the executive control flip flop is set, means in each processor responsive to a skip signal to perform executive control, forcing means coupled between the executive control flip flops of said first and second processors for responding to a set signal at the executive control flip flop of one of said processors to reset the executive control flip flop in the other of said processors, inhibiting means coupled to the executive control and executive function flip flops of said first and second processors for responding to the executive control and executive function flip flops of one processor being set to inhibit the setting of the executive control flip flop of the other processor, and means coupled to the executive control and executive function flip flops of each processor and to said inhibiting means to inhibit the executive control flip flop of one of said first and second processors from being set when the executive control flip flop of the other processor is receiving a set signal and the executive control flip flop of the other processor is in the set condition.

11. A system for providing executive control to a plurality of processors comprising an executive control flip flop and an executive function flip flop for each of said processors, a source of set, reset and skip instruction signals in each processor coupled to the executive control and executive function flip flop of the corresponding processors for selectably setting and resetting the executive function flip flops and for developing a skip signal when the executive control flip flop is set, means in each processor responsive to a skip signal to perform executive control in that processor, first forcing means coupled between the executive control flip flops of said plurality of processors for responding to a set signal at the executive control flip flop of one of said processors to apply a reset signal to the executive control flip flops of all other of said processors, second forcing means coupled between the executive control flip flops of said plurality of processors for responding to a reset signal at the executive control flip flop of one of said processors to apply a set signal to the executive control flip flop of a selected other one of said processors, inhibiting means coupled to the executive control and executive function flip flops of said plurality of processors for responding to the executive control and executive function flip flops of one processor being set to inhibit the setting of the executive control flip flops of the other processors, and means coupled to the source of set signals of each processor and to said inhibiting means to inhibit the executive control flip flop of each processor from being set when the executive control or executive function flip flop in one processor is receiving a set signal and the executive control flip flop in that processor is in the set condition.

12. In a system having a plurality of processors operating with a common memory system and with said memory system storing a common executive program, an executive control system comprising an executive control indicator and an executive function indicator for each processor, first means in each processor for selectably setting and resetting the executive control and the executive function indicator of the corresponding processor, second means in each processor for testing the state of the executive control indicator of that processor and transferring that processor to the executive program when the executive control indicator is set, and third means coupled between the executive control and executive function indicators of each one of said plurality of processors and to the executive control indicator of the other of said processors so that a selected executive control indicator of one processor is set only when another processor has the executive control indicator set and the executive function indicator reset and so that when a selected control indicator of one processor is set the executive control indicators of all other processors are reset.

13. In a computing system having a plurality of processors operable in response to a common executive program stored in a common memory, an executive control system comprising an executive control indicator and an executive function indicator in each processor with the executive control and executive function indicators having a set and a reset condition with the set condition of the executive control indicator indicating to the corresponding processor that it is capable of performing the executive program, and with the set condition of the executive function indicator indicating that the corresponding processor is performing said executive program, means in each processor for responding to the set condition of the executive control indicator to perform the executive program, means coupled between the executive control indicators in said plurality of processors for responding to the executive control indicator of one processor being set to apply a reset signal to the executive control indicators of the other processors, means coupled between the executive control indicators of said plurality of processors for responding to the executive control indicator of any one of said processors being reset to set the executive control indicator in predetermined ones of the other processors, and means coupled to the executive control and executive function indicators of said plurality of processors to inhibit the executive control indicator of the processors from being set when the executive function indicator of one of the processors is in a set condition.

14. In a computing system having a plurality of data handling units operable in response to an executive program stored in a memory comprising an executive control indicator and an executive function indicator for each data handling unit, each indicator having set and reset states, first means in each data handling unit for selectably setting and resetting the executive control indicator and the executive function indicator thereof, second means in each data handling unit for sampling the state of the executive control indicator of that data handling unit and in response to said executive control indicator being in the set state, controlling operation in that data handling unit to the executive program, third means coupling the executive control indicators of said plurality of data handling units so that when the executive control indicator of one data handling unit is set or reset the executive control indicator of a predetermined other data handling unit is respectively reset or set, and fourth means coupled from the executive control and the executive function indicator of each data handling unit to the executive control indicator of the other data handling units to inhibit the executive function indicators from being set when the executive control indicator and the executive function indicator of any one data handling unit are set.

15. In a computing system having a plurality of processors operable in response to a common executive program stored in a common memory, an executive control system comprising an executive control indicator and an executive function indicator for each processor with the executive control and executive function indicators each having a set and a reset condition with the corresponding processor being capable of performing the executive program when the executive control indicator is in the set condition, and with the corresponding processor performing said executive program when the executive function indicator is in the set condition, a source of set and reset control signals for each processor coupled to the executive control indicator and to the executive function indicator of the corresponding processor to selectively apply set and reset signals thereto, first means in each processor for responding to the set condition of the executive control indicator to perform the executive program, second means coupled between the executive control indicators of said plurality of processors for responding to the executive control indicator of one processor being set to apply a reset signal to the executive control indicators of the other processors, third means coupled between the executive control indicators of said plurality of processors for responding to the executive control indicator of one processor being reset to set the executive control indicator in a predetermined other processor, fourth means coupled to the executive control and executive function indicators of said plurality of processors to inhibit the executive control indicator of the processors from being set when the executive function indicator of one of the processors is in a set condition, and fifth means for each processor coupled to the executive control indicator in the corresponding processor to reset the executive control indicator in response to a failure condition in that processor.

16. A computing system having a plurality of processors comprising a source of request signals in each processor, an executive control indicator and an executive function indicator for each processor, the indicators for each processor coupled to the source of request signals of the corresponding processor for being set and reset thereby, means coupled between the executive control indicators for resetting the executive control indicators in a first processor having executive control when the executive control indicator is set in a second processor, means coupled between the executive control indicators for setting the executive control indicator in a first processor when the executive control indicator is reset in a second processor, means coupled to the executive control indicators and the executive function indicators of said plurality of processors to inhibit setting of an executive control indicator of a first processor when the executive function indicator is set of a second processor for which the executive control indicator is set, means coupled to said source of request signals and to the executive function and executive control indicators of each processor to set the corresponding executive function indicator only when the corresponding executive control indicator is set, and a source of interrupt control signals for each processor coupled to said executive control and executive function indicators of the corresponding processor for selectably developing interrupt signals to set the executive function indicator thereof only when the corresponding executive control indicator is set.

17. A system for transferring executive control between first and second processors performing routines of a common program comprising an executive control and an executive function flip flop in each processor, first gating means in each processor coupled to the corresponding executive control flip flop for setting said flip flop, second gating means in each processor coupled to the corresponding executive control flip flop for resetting said flip flop, third gating means in each processor coupled to the corresponding executive function flip flop for setting said flip flop, fourth gating means in each processor coupled to the corresponding executive function flip flop for resetting said flip flop, a source of set and reset signals in each processor coupled to said first, second, third and fourth gating means for selectively setting and resetting said flip flops, means coupling the first gating means of each processor and to the second gating means of the other processor to reset the executive control flip flop of one processor when the executive control flip flop of the other processor is set, means coupling the second gating means of each processor to the first gating means of the other processor for setting the executive control flip flop in one processor when the executive control flip flop of the other processor is reset, inhibiting means coupled between the executive control and executive function flip flop of each processor to the first gate of the other processor to inhibit the executive control flip flop of one processor from being set when the executive function and executive control flip flop of the other processors are set, and means coupled between said first and second gating means and said inhibiting means of each processor for inhibiting the executive control flip flop of one processor from being set when the executive control or the executive function flip flop of the other processor is set and respectively receive a set signal from the first or third gating means of the other processor.

18. A control system for a computing system having a plurality of processors responsive to an executive program stored in a memory system, each processor being responsive to set instructions, reset instructions and skip instruction, comprising an executive control and an executive function flip flop in each processor, first means in each processor coupled to the executive control and the executive function flip flops and responsive to the set instruction and the reset instructions to selectively set and reset the flip flops, second means in each processor coupled to the executive control flip flop in the corresponding processor for responding to a skip instruction to transfer the processor to the executive program when the executive control flip flop in that processor is set, first gating means in each processor coupled between said first means and the executive control flip flop in that processor for setting said flip flop, second gating means in each processor coupled between said first means and the executive control flip flop in that processor for resetting said flip flop, third gating means in each processor coupled between said first means and the executive function flip flop in the corresponding processor for setting said flip flop, fourth gating means in each processor coupled between said first means and the executive function flip flop of the corresponding processor for resetting said flip flop, program interrupt means in each processor coupled to the executive control flip flop and to the third gating means of the corresponding processor for setting the executive function flip flop in response to an interrupt condition, said means developing said interrupt condition in response to the executive control flip flop being in a set condition, input-output control means coupled to the executive control flip flop of each processor for responding to the processor in which the executive control flip flop is set for performing predetermined input-output operations, first means coupling the first and second gating means of each processor for responding to the executive control flip flop of one processor being set to reset the executive control flip flop being a set condition in another processor, second means coupling the first and second gating means of said plurality of processors for responding to the executive control flip flop of one processor being reset to set the executive control flip flop of a predetermined other processor, and third means coupled from the executive control and the executive function flip flop of each processor to the first gating means of the other processors to inhibit setting of the executive control flip flops of the processors when the executive control and the executive function flip flops of one processor are set.

19. In a computing system having first and second data handling units operating in response to a job program and an executive program stored in a common memory comprising an executive control indicator and an executive function indicator in each data handling unit, each indicator having set and reset states, first means in each data handling unit for selectably setting and resetting the executive control indicator and the executive function indicator therein, second means in each data handling unit for sampling the state of the executive control indicator in that processor and in response to said executive control indicator being in the set state, transferring operation in that data handling unit to the executive program, third means coupling the executive control indicators in said first and second data handling units so that when the executive control indicator in one of said first and second data handling units is set or reset the executive control indicator in the other data handling unit is respectively reset or set, fourth means coupled to the executive control indicator and the executive function indicator in each data handling unit and to the executive control indicator of the other data handling unit to inhibit an executive function indicator from being set in one of said first and second data handling units when the executive control indicator and the executive function indicator in the other of said data handling unit are set, and fifth means coupled to the executive control indicator and the executive function indicator of said first and second data handling units to prevent the executive control indicator in said first and second data handling units from being set when the executive control or executive function indicator in one of the data handling units is in a set state and is selected to be set by the corresponding first means.

20. A control system for a computer system having a plurality of processors responding to a job program and an executive program stored in a memory system, each processor being responsive to set instructions, reset instructions and skip instructions, comprising an executive control and an executive function flip flop in each processor, first means in each processor coupled to the executive control and the executive function flip flops and responsive to the set instructions and the reset instructions to selectably set and reset the flip flops, second means in each processor coupled to the executive control flip flop in the corresponding processor for responding to a skip instruction to transfer the processor to the executive program when the executive control flip flop in that processor is set, first gating means in each processor coupled between said first means and the executive control flip flop in that processor for setting said flip flop, second gating means in each processor coupled between said first means and the executive control flip flop in that processor for resetting said flip flop, third gating means in each processor coupled between said first means and the executive function flip flop in the corresponding processor for setting said flip flop, fourth gating means in each processor coupled between said first means and the executive function flip flop of the corresponding processor for resetting said flip flop, program interrupt means in each processor coupled to the executive control flip flop and to the third gating means of the corresponding processor for setting the executive function flip flop in response to an interrupt condition, said means developing said interrupt condition in response to the executive control flip flop being in a set condition, input-output control means coupled to the executive control flip flop of each processor for responding to the processor in which the executive control flip flop is set for performing predetermined input-output operations, first means coupling the first and second gating means of each processor for responding to the executive control flip flop of one processor being set to reset the executive control flip flop being in a set condition in another processor, second means coupling the first and second gating means of said plurality of processors for responding to the executive control flip flop of one processor being reset to set the executive control flip flop of a predetermined other processor, third means coupled from the executive control and the executive function flip flop of each processor to the first gating means of the other processors to inhibit setting of the executive control flip flops of the processors when the executive control and the executive function flip flops of one processor are set, and a source of processor failure signals in each processor coupled to the second gating means in the corresponding processor for resetting the executive control flip flop in response to failure of a processor.

References Cited

UNITED STATES PATENTS

| | | | |
|---|---|---|---|
| 3,200,380 | 8/1965 | MacDonald et al. | 340—172.5 |
| 3,226,687 | 12/1965 | Amdahl et al. | 340—172.2 |
| 3,229,260 | 1/1966 | Falkoff | 340—172.5 |
| 3,263,219 | 7/1966 | Brun et al. | 340—172.5 |
| 3,303,474 | 2/1967 | Moore et al. | 340—172.5 |

PAUL J. HENON, *Acting Primary Examiner.*

R. M. RICKERT, *Assistant Examiner.*